United States Patent
Egilmez et al.

(10) Patent No.: US 11,323,748 B2
(45) Date of Patent: May 3, 2022

(54) TREE-BASED TRANSFORM UNIT (TU) PARTITION FOR VIDEO CODING

(71) Applicant: QUALCOMM Incorporated, San Diego, CA (US)

(72) Inventors: Hilmi Enes Egilmez, San Diego, CA (US); Vadim Seregin, San Diego, CA (US); Amir Said, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/715,274

(22) Filed: Dec. 16, 2019

(65) Prior Publication Data

US 2020/0204833 A1    Jun. 25, 2020

Related U.S. Application Data

(60) Provisional application No. 62/782,292, filed on Dec. 19, 2018.

(51) Int. Cl.
*H04N 19/96* (2014.01)
*H04N 19/159* (2014.01)
(Continued)

(52) U.S. Cl.
CPC .......... *H04N 19/96* (2014.11); *H04N 19/159* (2014.11); *H04N 19/176* (2014.11); *H04N 19/60* (2014.11)

(58) Field of Classification Search
CPC ...... H04N 19/70; H04N 19/119; H04N 19/46; H04N 19/96; H04N 19/12
See application file for complete search history.

(56) References Cited

U.S. PATENT DOCUMENTS

| 4,894,713 A | 1/1990 | Delogne et al. |
| 5,136,371 A | 8/1992 | Savatier et al. |

(Continued)

FOREIGN PATENT DOCUMENTS

| CN | 1289213 A | 3/2001 |
| CN | 1662066 A | 8/2005 |

(Continued)

OTHER PUBLICATIONS

Said et al., "Description of Core Experiment 6 (CE6): Transforms and transform signalling," Joint Video Experts Team (JVET) of ITU-T SG 16 WP 3 and ISO/IEC JTC 1/SC 29/WG 11, 12th Meeting: Macao, CN, Oct. 3-12, 2018, JVET-L1026 (Year: 2018).*

(Continued)

*Primary Examiner* — Daniel Chang
(74) *Attorney, Agent, or Firm* — Shumaker & Sieffert, P.A.

(57) ABSTRACT

A video decoder may receive, in a bitstream that comprises an encoded representation of video data, information indicating whether a residual block is partitioned and information indicating a partition tree type for the residual block based on the residual block being partitioned, wherein the residual block is indicative of a difference between a current block and a prediction block. The video decoder may determine, based on the received information that the residual block is partitioned and the partition tree type for the residual block, a plurality of residual sub-blocks into which the residual block is partitioned according to the partition tree type. The video decoder may produce the residual data for the current block based at least in part on the residual block being partitioned according to the partition tree type into the plurality of residual sub-blocks and may decode the current block using the residual data.

38 Claims, 14 Drawing Sheets

(51) Int. Cl.
*H04N 19/60* (2014.01)
*H04N 19/176* (2014.01)

(56) References Cited

U.S. PATENT DOCUMENTS

| | | | |
|---|---|---|---|
| 5,629,779 | A | 5/1997 | Jeon |
| 5,684,536 | A | 11/1997 | Sugiyama et al. |
| 5,721,822 | A | 2/1998 | Agarwal |
| 5,767,909 | A | 6/1998 | Jung |
| 5,768,434 | A | 6/1998 | Ran |
| 5,815,601 | A | 9/1998 | Katata et al. |
| 5,974,181 | A | 10/1999 | Prieto |
| 5,995,055 | A | 11/1999 | Milroy |
| 6,115,071 | A | 9/2000 | Hurst, Jr. et al. |
| 6,157,676 | A | 12/2000 | Takaoka et al. |
| 6,345,121 | B1 | 2/2002 | Matsumoto |
| 6,476,805 | B1 | 11/2002 | Shum et al. |
| 6,654,503 | B1 | 11/2003 | Sudharsanan et al. |
| 6,674,910 | B1 | 1/2004 | Moon et al. |
| 6,724,818 | B1 | 4/2004 | Frojdh et al. |
| 6,795,584 | B2 | 9/2004 | Karczewicz et al. |
| 6,917,711 | B1 | 7/2005 | Wang et al. |
| 7,142,231 | B2 | 11/2006 | Chipchase et al. |
| 7,145,948 | B2 | 12/2006 | Ye et al. |
| 7,170,937 | B2 | 1/2007 | Zhou |
| 7,190,840 | B2 | 3/2007 | Said |
| 7,215,707 | B2 | 5/2007 | Lee et al. |
| 7,233,623 | B1 | 6/2007 | Pau et al. |
| 7,263,232 | B2 | 8/2007 | Srinivasan |
| 7,266,149 | B2 | 9/2007 | Holcomb et al. |
| 7,289,674 | B2 | 10/2007 | Karczewicz |
| 7,379,501 | B2 | 5/2008 | Lainema |
| 7,379,608 | B2 | 5/2008 | Marpe et al. |
| 7,529,484 | B2 | 5/2009 | Xu et al. |
| 7,664,184 | B2 | 2/2010 | Reznic et al. |
| 7,702,013 | B2 | 4/2010 | Schwarz et al. |
| 7,706,443 | B2 | 4/2010 | Chandramouly et al. |
| 7,751,476 | B2 | 7/2010 | Tanizawa et al. |
| 7,751,478 | B2 | 7/2010 | Kim et al. |
| 7,751,479 | B2 | 7/2010 | Paniconi et al. |
| 7,782,954 | B2 | 8/2010 | Liang et al. |
| 7,792,390 | B2 | 9/2010 | Prakash et al. |
| 7,847,861 | B2 | 12/2010 | Zhai et al. |
| 7,925,107 | B2 | 4/2011 | Kim et al. |
| 7,933,337 | B2 | 4/2011 | Srinivasan et al. |
| 7,944,965 | B2 | 5/2011 | Bhaskaran et al. |
| 7,970,058 | B2 | 6/2011 | Suzuki |
| 8,024,121 | B2 | 9/2011 | Tang |
| 8,036,264 | B2 | 10/2011 | Doshi |
| 8,135,064 | B2 | 3/2012 | Tasaka et al. |
| 8,199,819 | B2 | 6/2012 | Seo et al. |
| 8,238,428 | B2 | 8/2012 | Karczewicz |
| 8,406,299 | B2 | 3/2013 | Karczewicz |
| 8,428,133 | B2 | 4/2013 | Ye et al. |
| 8,488,668 | B2 | 7/2013 | Ye et al. |
| 8,488,672 | B2 | 7/2013 | Karczewicz |
| 8,571,104 | B2 | 10/2013 | Ye et al. |
| 8,619,853 | B2 | 12/2013 | Ye et al. |
| 8,902,984 | B2 | 12/2014 | Jeon |
| 9,077,999 | B2 | 7/2015 | Sato et al. |
| 9,172,968 | B2 | 10/2015 | Karczewicz et al. |
| 9,215,470 | B2 | 12/2015 | Karczewicz et al. |
| 9,319,684 | B2 | 4/2016 | Karczewicz et al. |
| 9,998,740 | B2* | 6/2018 | Sezer .............. H04N 19/426 |
| 10,264,283 | B2* | 4/2019 | Lee .............. H04N 19/122 |
| 10,306,229 | B2 | 5/2019 | Zhao et al. |
| 11,051,011 | B2* | 6/2021 | Lee .............. H04N 19/96 |
| 2002/0055215 | A1 | 5/2002 | Tamura et al. |
| 2003/0081850 | A1 | 5/2003 | Karczewicz et al. |
| 2003/0128753 | A1 | 7/2003 | Lee et al. |
| 2003/0138150 | A1 | 7/2003 | Srinivasan |
| 2003/0146936 | A1 | 8/2003 | Greer et al. |
| 2003/0156648 | A1 | 8/2003 | Holcomb et al. |
| 2003/0169931 | A1 | 9/2003 | Lainema |
| 2003/0206594 | A1 | 11/2003 | Zhou |
| 2003/0223493 | A1 | 12/2003 | Ye et al. |
| 2003/0231795 | A1 | 12/2003 | Karczewicz |
| 2004/0008771 | A1 | 1/2004 | Karczewicz |
| 2004/0120590 | A1 | 6/2004 | Fuchs et al. |
| 2004/0151395 | A1 | 8/2004 | Kesaniemi et al. |
| 2004/0213348 | A1 | 10/2004 | Kim et al. |
| 2005/0025236 | A1 | 2/2005 | Yan et al. |
| 2005/0036549 | A1 | 2/2005 | He et al. |
| 2005/0078754 | A1 | 4/2005 | Liang et al. |
| 2005/0123207 | A1 | 6/2005 | Marpe et al. |
| 2005/0152452 | A1 | 7/2005 | Suzuki |
| 2005/0157784 | A1 | 7/2005 | Tanizawa et al. |
| 2005/0157797 | A1 | 7/2005 | Gaedke |
| 2005/0213660 | A1 | 9/2005 | Paniconi et al. |
| 2005/0243920 | A1 | 11/2005 | Murakami et al. |
| 2005/0281334 | A1 | 12/2005 | Walker et al. |
| 2005/0281337 | A1 | 12/2005 | Kobayashi et al. |
| 2006/0104527 | A1 | 5/2006 | Koto et al. |
| 2006/0120456 | A1 | 6/2006 | Tasaka et al. |
| 2006/0146936 | A1 | 7/2006 | Srinivasan |
| 2006/0153295 | A1 | 7/2006 | Wang et al. |
| 2006/0218482 | A1 | 9/2006 | Ralston et al. |
| 2007/0002945 | A1 | 1/2007 | Kim |
| 2007/0005795 | A1 | 1/2007 | Gonzalez |
| 2007/0014348 | A1 | 1/2007 | Bao et al. |
| 2007/0025631 | A1 | 2/2007 | Kim et al. |
| 2007/0036215 | A1 | 2/2007 | Pan et al. |
| 2007/0070082 | A1 | 3/2007 | Brennan |
| 2007/0160303 | A1 | 7/2007 | Guleryuz et al. |
| 2007/0206872 | A1 | 9/2007 | Song |
| 2008/0008246 | A1 | 1/2008 | Mukherjee et al. |
| 2008/0075171 | A1 | 3/2008 | Suzuki |
| 2008/0159389 | A1 | 7/2008 | Lee et al. |
| 2008/0232463 | A1 | 9/2008 | Lu et al. |
| 2008/0260030 | A1 | 10/2008 | Karczewicz |
| 2008/0260031 | A1 | 10/2008 | Karczewicz |
| 2008/0310504 | A1 | 12/2008 | Ye et al. |
| 2008/0310507 | A1 | 12/2008 | Ye et al. |
| 2008/0310745 | A1 | 12/2008 | Ye et al. |
| 2009/0052534 | A1 | 2/2009 | Wang et al. |
| 2009/0060362 | A1 | 3/2009 | Harmanci et al. |
| 2009/0123066 | A1 | 5/2009 | Moriya et al. |
| 2010/0020867 | A1 | 1/2010 | Wiegand et al. |
| 2010/0054334 | A1 | 3/2010 | Yoo et al. |
| 2010/0054615 | A1 | 3/2010 | Choi et al. |
| 2010/0118943 | A1 | 5/2010 | Shiodera et al. |
| 2010/0128995 | A1 | 5/2010 | Drugeon et al. |
| 2010/0172409 | A1 | 7/2010 | Reznik et al. |
| 2010/0208802 | A1 | 8/2010 | Tsukuba et al. |
| 2010/0284459 | A1 | 11/2010 | Jeong et al. |
| 2011/0116539 | A1 | 5/2011 | He et al. |
| 2011/0317757 | A1 | 12/2011 | Coban et al. |
| 2012/0008675 | A1 | 1/2012 | Karczewicz et al. |
| 2012/0027079 | A1 | 2/2012 | Ye et al. |
| 2012/0057630 | A1 | 3/2012 | Saxena et al. |
| 2012/0099646 | A1 | 4/2012 | Coban et al. |
| 2012/0170649 | A1 | 7/2012 | Chen et al. |
| 2012/0177120 | A1 | 7/2012 | Guo et al. |
| 2012/0300835 | A1 | 11/2012 | Karczewicz |
| 2013/0044812 | A1 | 2/2013 | Ye et al. |
| 2013/0114669 | A1 | 5/2013 | Karczewicz et al. |
| 2013/0128974 | A1 | 5/2013 | Chien et al. |
| 2013/0182772 | A1 | 7/2013 | Seregin et al. |
| 2013/0272381 | A1* | 10/2013 | Guo .............. H04N 19/119 375/240.02 |
| 2014/0044162 | A1* | 2/2014 | Guo .............. H04N 19/30 375/240.02 |
| 2014/0140400 | A1 | 5/2014 | George et al. |
| 2014/0254675 | A1 | 9/2014 | Lee et al. |
| 2014/0307780 | A1 | 10/2014 | Cohen et al. |
| 2015/0071359 | A1 | 3/2015 | Guo et al. |
| 2015/0181237 | A1 | 6/2015 | Tsukuba et al. |
| 2015/0272658 | A1 | 10/2015 | Barrett et al. |
| 2016/0219302 | A1 | 7/2016 | Liu et al. |
| 2016/0261866 | A1 | 9/2016 | Oh et al. |
| 2017/0019686 | A1* | 1/2017 | Chiu .............. H04N 19/12 |
| 2017/0155905 | A1* | 6/2017 | Puri .............. H04N 19/63 |
| 2017/0208336 | A1 | 7/2017 | Li et al. |
| 2018/0020218 | A1 | 1/2018 | Zhao et al. |

(56) References Cited

U.S. PATENT DOCUMENTS

| | | | |
|---|---|---|---|
| 2018/0063553 A1 | 3/2018 | Zhang et al. | |
| 2018/0098081 A1 | 4/2018 | Zhao et al. | |
| 2018/0103252 A1 | 4/2018 | Hsieh et al. | |
| 2018/0160113 A1* | 6/2018 | Jeong | H04N 19/593 |
| 2018/0167618 A1* | 6/2018 | Lee | H04N 19/14 |
| 2018/0249177 A1* | 8/2018 | Lin | H04N 19/593 |
| 2018/0262777 A1 | 9/2018 | Filippov et al. | |
| 2018/0288437 A1 | 10/2018 | Hsiang | |
| 2018/0288439 A1 | 10/2018 | Hsu et al. | |
| 2019/0222853 A1 | 7/2019 | Keinert et al. | |
| 2019/0230377 A1* | 7/2019 | Ma | H04N 19/85 |
| 2019/0273936 A1* | 9/2019 | Ma | H04N 19/59 |
| 2019/0273950 A1* | 9/2019 | Wang | H04N 19/176 |
| 2019/0306536 A1* | 10/2019 | Lim | H04N 19/129 |
| 2019/0320203 A1* | 10/2019 | Chiang | H04N 19/521 |
| 2019/0327483 A1* | 10/2019 | Chen | H04N 19/513 |
| 2019/0335180 A1* | 10/2019 | Philippe | H04N 19/13 |
| 2019/0373261 A1 | 12/2019 | Egilmez et al. | |
| 2020/0021852 A1 | 1/2020 | Chao et al. | |
| 2020/0059667 A1* | 2/2020 | Lee | H04N 19/176 |
| 2020/0112734 A1* | 4/2020 | Zhao | H04N 19/176 |
| 2020/0186805 A1* | 6/2020 | Lee | H04N 19/103 |
| 2020/0304816 A1* | 9/2020 | Zhao | H04N 19/124 |
| 2021/0360246 A1* | 11/2021 | Furht | H04N 19/119 |

FOREIGN PATENT DOCUMENTS

| | | |
|---|---|---|
| CN | 1798341 A | 7/2006 |
| CN | 1801940 A | 7/2006 |
| CN | 101577605 A | 11/2009 |
| CN | 102316320 A | 1/2012 |
| CN | 103329523 A | 9/2013 |
| CN | 103402097 A | 11/2013 |
| EP | 0663778 A2 | 7/1995 |
| EP | 1370087 A1 | 12/2003 |
| EP | 1553782 A2 | 7/2005 |
| EP | 1679903 A2 | 7/2006 |
| EP | 1768415 A1 | 3/2007 |
| EP | 1876838 A2 | 1/2008 |
| EP | 1457056 B1 | 8/2016 |
| JP | 1155678 A | 6/1989 |
| JP | 2070127 A | 3/1990 |
| JP | 08280032 | 10/1996 |
| JP | 10271505 A | 10/1998 |
| JP | 2002135126 A | 5/2002 |
| JP | 2002232887 A | 8/2002 |
| JP | 2003250157 A | 9/2003 |
| JP | 2004007766 A | 1/2004 |
| JP | 2005176073 A | 6/2005 |
| JP | 2006191628 A | 7/2006 |
| JP | 2006295408 A | 10/2006 |
| JP | 2007053561 A | 3/2007 |
| JP | 2007074050 A | 3/2007 |
| JP | 2007189276 A | 7/2007 |
| JP | 2007267123 A | 10/2007 |
| JP | 2008022405 A | 1/2008 |
| JP | 2008154155 A | 7/2008 |
| JP | 2008193627 A | 8/2008 |
| JP | 2009513056 A | 3/2009 |
| JP | 2009118233 A | 5/2009 |
| JP | 2014504820 A | 2/2014 |
| JP | 2015507429 A | 3/2015 |
| KR | 1019980034151 | 8/1998 |
| KR | 20060079087 A | 7/2006 |
| RU | 2119727 | 9/1998 |
| RU | 2127962-01 | 3/1999 |
| RU | 2162280-02 | 1/2001 |
| RU | 2258320 C2 | 8/2005 |
| RU | 2004125588 A | 1/2006 |
| RU | 2005113308 A | 1/2006 |
| RU | 2005137246 A | 6/2007 |
| RU | 2314656 C2 | 1/2008 |
| WO | WO-9421083 A1 | 9/1994 |
| WO | WO-9800807 A1 | 1/1998 |
| WO | WO-03063501 A1 | 7/2003 |

| | | | |
|---|---|---|---|
| WO | WO-2004032032 A1 | 4/2004 | |
| WO | WO-2005107267 A1 | 11/2005 | |
| WO | WO-2007010690 A1 | 1/2007 | |
| WO | WO-07046644 | 4/2007 | |
| WO | WO-2007063472 A2 | 6/2007 | |
| WO | WO-2008044658 A1 | 4/2008 | |
| WO | WO-2008084817 A1 | 7/2008 | |
| WO | WO-2008088140 A1 | 7/2008 | |
| WO | WO-2008131042 A1 | 10/2008 | |
| WO | WO-2008131045 A2 | 10/2008 | |
| WO | WO-2008157360 A2 | 12/2008 | |
| WO | WO-2008157431 A2 | 12/2008 | |
| WO | WO-2009080133 A1 | 7/2009 | |
| WO | WO-2011031332 A1 | 3/2011 | |
| WO | WO-2011163517 A1 | 12/2011 | |
| WO | WO-2012006568 A1 | 1/2012 | |
| WO | WO-2012006574 A2 | 1/2012 | |
| WO | 2013106710 A2 | 7/2013 | |
| WO | WO-2017123980 A1 | 7/2017 | |
| WO | WO-2018012830 A1 * | 1/2018 | H04N 19/159 |
| WO | WO-2018035130 A1 | 2/2018 | |
| WO | WO-2019076206 A1 | 4/2019 | |

OTHER PUBLICATIONS

Aase S.O., et al., "A Critique of SVD-Based Image Coding Systems", IEEE Circuits and Systems, Orlando, FL, vol. 4, May 30, 1999-Jun. 2, 1999, pp. 13-16, XP002503942.

Amonou (FT) I et al:"Description of Video coding technology proposal by France Telecom, NTT, NTT DoCoMo, Panasonic and Technicolor", JCTVC-A114, 1.JCT-VC Meeting: Apr. 15, 2010-Apr. 23, 2010; Dresen; (Jointcollaborative Team on Video Coding of ISO/IEC JTC1/SC29/WG11 and ITU-TSG.16); URL: http://wftp3.itu.int/av-arch/jctvc-site/,, No. XP030007552, May 7, 2010 (May 7, 2010), XP030007553, ISSN: 0000-0049 p. 54-p. 61 p. 81-p. 85, 248 pages.

"An, et al., "Non-CE7: Boundary-Dependent Transform for Inter-Predicted Residue," JCTVCG281, JCT-VC Meeting; Joint Collaborative Team on Video Coding (JCT-VC), of ITU-T SG16 WP3 and ISO/IEC JTC1/SC29/WG11; Nov. 21-30, 2011; document No. JCTVC-G281, Nov. 22, 2011, 10 pages."

An J., et al., "Non-CE7: Boundary-Dependent Transform for Inter-Predicted Residue", Document JCTVC-G281, 7th Meeting: Geneva, CH, Nov. 21-30, 2011, 11 pages.

Anonymous: "JVET-C0022 web page in JVET repository," May 19, 2016, XP055482600, 4 pages, [retrieved on Jun. 8, 2018].

Anonymous: "Source Code TComRom.cpp ofJVET-C0022-v4. zip," May 19, 2016, pp. 1-77, XP055482573, Retrieved from the Internet: URL: http://phenix.it-sudparis.eu/jvet/ [retrieved on Jun. 8, 2018].

Bossen F., et al., "JEM Software Manual," Joint Collaborative Team on Video Coding (JCT-VC) of ITU-T SG16 WP3 and ISO/IEC JTC1/SC29/WG11, Document: JCTVC-Software Manual, Retrieved on Aug. 3, 2016, pp. 1-29.

Britanak V., et al., "Discrete Cosine and Sine Transforms: General Properties, Fast Algorithms and Integer Approximations", Acadmemic Press, 2007, pp. 16-38.

Bross B., et al., "High Efficiency Video Coding (HEVC) text specification draft 10 (for FDIS & Consent)," Joint Collaborative Team on Video Coding (JCT-VC) of ITU-T SG 16 WP 3 and ISO/IEC JTC 1/SC 29/WG 11, Document: JCTVC-L1003_v34, 12th Meeting: Geneva, CH, Jan. 14-23, 2013, 310 pages.

Bross B., et al., "High Efficiency Video Coding (HEVC) Text Specification Draft 7," JCTVC-I1003 d2, 9. JCT-VC Meeting; 100. MPEG Meeting; Apr. 27, 2012-May 7, 2012; Geneva; (Joint Collaborative Team on Video Coding of ISO/IEC JTC1/SC29/WG11 and ITU-T SG.16 ); URL: http://wftp3.1tu.int/av-arch/jctvc-site/, No. JCTVC-I1003, May 10, 2012 (May 10, 2012), XP030112373.

Bross B., et al., "High Efficiency Video Coding (HEVC) Text Specification Draft 8", Jul. 11-20, 2012, 10. JCT-VC Meeting, 101. MPEG Meeting, Stockholm; (Joint Collaborative Team on Video Coding of ISO/IEC JTC1/SC29/WG11 and ITU-T SG.16); URL: http://wftp3.itu.int/av-arch/jctvc-site/,, No. JCTVC-J1003_d7, XP030112947, pp. 197-201, section A.4.1 ,A.4.2, 260 pages.

(56) References Cited

OTHER PUBLICATIONS

Bross B., et al., "Versatile Video Coding (Draft 1)", JVET-J1001-v2, Joint Video Experts Team (JVET) of ITU-T SG 16 WP 3 and ISO/IEC JTC 1/SC 29/WG 11, 10th Meeting, Apr. 2018, JVET-J1001-v2, 43 pages.

Bross B., et al., "Versatile Video Coding (Draft 5)", Joint Video Experts Team (JVET) of ITU-T SG 16 WP 3 and ISO/IEC JTC 1/SC 29/WG 11, 14th Meeting: Geneva, CH, Mar. 19-27, 2019, JVET-N1001-v3, 371 pages.

Bross B., et al., "Versatile Video Coding (Draft 6)", Joint Video Experts Team (JVET) of ITU-T SG 16 WP 3 and ISO/IEC JTC 1/SC 29/WG 11, JVET-O2001-vE, Jul. 3-12, 2019, 455 pages.

Bross B., et al., "Versatile Video Coding (Draft 7)", Joint Video Experts Team (JVET) of ITU-T SG 16 WP 3 and ISO/IEC JTC 1/SC 29/WG 11, JVET-P2001-v9, 16th Meeting: Geneva, CH, Oct. 1-11, 2019, 490 pages.

Bross, et al., "High Efficiency Video Coding (HEVC) Text Specification Draft 6," JCTVC-H1003, Joint Collaborative Team on Video Coding (JCT-VC) of ITU-T SG16 WP3 and ISO/IEC JTC1/SC29/WG11, 8th Meeting: San José, CA, USA, Feb. 1-10, 2012, 259 pp, p. 1-7, 34, 54-55, 74-75, 90-98, 220-224, URL: http://wftp3.itu.int/AV-ARCH/JCTVC-SITE/.

Bross, et al., "High Efficiency Video Coding (HEVC) Text Specification Draft 9", Joint Collaborative Team on Video Coding (JCT-VC) of ITU-T SG16 WP3 and ISO/IEC JTC1/SC29/WG11, JCTVC-K1003_v7, 11th Meeting: Shanghai, CN, Oct. 10-19, 2012, 290 pp.

Bross, et al., "WD4: Working Draft 4 of High-Efficiency Video Coding," JCTVC-F803_d2, (JCT-VC) of ITU-T SG16 WP3 and ISO/IEC JTC1/SC29/WG11 Joint Collaborative Team on Video Coding, 6th Meeting, Torino, IT, Jul. 14-22, 2011, 226 pp.

Bross, et al., "WD5: Working Draft 5 of High-Efficiency Video Coding," JCTVC-G1103_d2, (JCT-VC) of ITU-T SG16 WP3 and ISO/IEC JTC1/SC29/WG11 Joint Collaborative Team on Video Coding, 7th Meeting, Geneva, Switzerland (Nov. 2011), 214 pages.

Business Communication: "Business Communication", Kabushiki Kaisha Business Communication Sha, vol. 44, No. 6, Jun. 1, 2007, pp. 11, ISSN: 0385-695X, p. 92.

Chen J., et al., "Algorithm description for Versatile Video Coding and Test Model 1 (VTM 1)", Joint Video Exploration Team (JVET) of ITU-T SG 16 WP 3 and ISO/IEC JTC 1/SC 29/WG 11, 10th Meeting: San Diego, US, Apr. 10-20, 2018, Jun. 16, 2018, JVET-J1002-v2, 10 pages, XP030198635, http://phenix.int-evry.fr/jvet/doc_end_user/documents/10_SanDiego/wg11/JVET-J1002-v2.zip.

Chen J., et al., "Algorithm Description for Versatile Video Coding and Test Model 3 (VTM 3)", 12, JVET Meeting, Oct. 3, 2018-Oct. 12, 2018, Macao, (The Joint Video Exploration Team of ISO/IEC JTC1/SC29/WG11 and ITU-T SG.16, JVET-L1002, Dec. 3, 2018 (Dec. 3, 2018), XP030198628, 38 pages, Retrieved from the Internet: URL: http://phenix.int-evry.fr/jvet/doc_end_user/documents/12_Macao/wg11/JVET-L1002-v1.zip JVET-L1002-v1.docx [retrieved on Dec. 3, 2018], paragraph [3.2.5], paragraph [3.9.1].

Chen J., et al., "Algorithm Description of Joint Exploration Test Model 1", Joint Video Exploration Team (JVET) of ITU-T SG 16 WP 3 and ISO/IEC JTC 1/SC 29/WG 11, 1nd Meeting: Geneva, CH, Oct. 19-21, 2015, 27 Pages, JVET-A1001.

Chen J., et al., "Algorithm Description of Joint Exploration Test Model 7 (JEM7)", JVET-G1001-V1, Joint Video Exploration Team (JVET)OF ITU-T SG 16 WP 3 and ISO/IEC JTC 1/SC 29/WG 11, 7th Meeting, Jul. 13, 2017-Jul. 21, 2017, Torino, Aug. 19, 2017 (Aug. 19, 2017), 51 Pages, XP030150980, pp. i-iv, Retrieved from the Internet: URL: http://phenix.int-evry.fr/jvet/doc_end_user/documents/7_Torino/wg11/JVET-G0001-v1.zip, p. 20, Paragraph 2.3.7—p. 23, Paragraph 2.3.7.6, p. 17, Paragraph 2.3.5—p. 18, section 2.

Chen J., et al., "Coding Tools Investigation for Next Generation Video Coding", ITU-T SG 16, Contribution 806, COM16-C806-E, Draft, Study Period 2013-2016, International Telecommunication Union, Geneva, CH, vol. 6/16, Jan. 27, 2015 (Jan. 27, 2015), XP044083237, pp. 1-7. [Retrieved on Jan. 27, 2015].

Chen J., et al., "Algorithm Description of Joint Exploration Test Model 2," Joint Video Exploration Team (JVET) of ITU-T SG 16 WP 3 and ISO/IEC JTC 1/SC 29/WG 11, 2nd Meeting, Document No. JVET-B1001_v1, Feb. 20-26, 2016, 31 pages.

Conklin, et al.: "New Intra Prediction Modes," ITU-Telecommunications Standardization Sector, Study Group 16, Question 6, Video Coding Experts Group (VCEG), Document No. VCEG-N54, pp. 1-10, XP0300003304, 14th Meeting: Santa Barbara, Sep. 24-27, 2001.

Davies T., et al., "Suggestion for a Test Model", BBC, JCTVC-A033, 1st Meeting, Apr. 15, 2010-Apr. 23, 2010, (Joint Collaborative Team on Video Coding of ISO/IEC JTC1/SC29/WG11 and ITU-TSG 16), Dresden, DE, XP030007526, May 7, 2010 (May 7, 2010), pp. 1-30.

Dong et al.,"Introduction to Test Model under Consideration (TmuC)" (Jun. 27, 2010) 3 pages.

Egilmez H.,et al., "CE3/6-related: Unification of RQT-like Transform Partitioning for Intra and Inter Blocks", Joint Video Experts Team (JVET) of ITU-T SG 16 WP 3 and ISO/IEC JTC 1/SC 29/WG 11, JVET-M0524-V2, 13th Meeting: Marrakesh, MA, Jan. 9-18, 2019, pp. 1-7.

Egilmez H.,et al., "CE6: RQT-like Transform Partitioning for Inter Blocks (Test 6.4.2)", Joint Video Experts Team (JVET) of ITU-T SG 16 WP 3 and ISO/IEC JTC 1/SC 29/WG 11, JVET-M0523-v1, 13th Meeting: Marrakesh, MA, Jan. 9-18, 2019, pp. 1-4.

Ergen S., "ZigBee/IEEE 802.15.4 Summary", Sep. 10, 2004, 37 Pages.

Fan X., et al., "A Novel Coefficient Scanning Scheme for Directional Spatial Prediction-Based Image Compression", Proceedings of International Conference on Multimedia and EXPO, 2003, Jul. 6-9, 2003, Piscataway, NJ, vol. 2, pp. 557-560, XP010650616.

Fu, et al., "A Comparative Study of Compensation Techniques in Directional DCT's," IEEE International Symposium on Circuits and Systems (ISCAS) 2007, pp. 521-524, May 27-30, 2007.

Fu, Jingjing, et al, "Diagonal Discrete Cosine Transforms for Image Coding," (Nov. 2, 2006), Advances in Multimedia Information Processing—Proceedings of the 7th Pacific Rim Conference on Multimedia, PCM 2006, Huangzhou, China, Nov. 2-4, 2006 Lecture Notes in Computer Science;LNCS, Springer, Berlin, DE, pp. 150-158, XP019047687, ISBN: 978-3-540-48766-1.

Han J., et al., "Towards jointly optimal spatial prediction and adaptive transform in video/image coding," IEEE International Conference on Acoustics, Speech and Signal Processing (ICASSP), pp. 726-729 (Mar. 2010).

Han W-J., et al., "Improved Video Compression Efficiency Through Flexible Unit Representation and Corresponding Extension of Coding Tools," IEEE Transactions on Circuits and Systems for Video Technology, vol. 20, No. 12, Dec. 2010, pp. 1709-1720.

Iain Richardson: Video Coding H.264 i MPEG-4—New Generation Standards, Moscow, Tekhnosfera, 2005, translation of 2003 publication, 198 pages, pp. 145-183, 233-240.

IEEE Std 802.11ad-2012: "Part 11: Wireless LAN Medium Access Control (MAC) and Physical Layer (PHY) Specifications—Amendment 3: Enhancements for Very High Throughput in the 60 GHz Band", LAN/MAN Standards Committee of the IEEE Computer Society, Dec. 28, 2012, 628 Pages.

"Information technology—Dynamic Adaptive Streaming over HTTP {DASH)—Part 1: Media Presentation Description and Segment Formats," ISO/IEC 23009-1, International Standard, Draft third edition, Jan. 9, 2017, 216 pp.

International Search Report and Written Opinion—PCT/US2019/066966—ISA/EPO—dated Mar. 3, 2020 15 pages.

International Search Report and Written Opinion—PCT/US2016/014898—ISA/EPO—dated Jul. 12, 2016 21 pages.

ITU-T H.223, Series H: Audiovisual and Multimedia Systems, Infrastructure of Audiovisual Services—Transmission Multiplexing and Synchronization, Multiplexing Protocol for Low Bit Rate Multimedia Communication, The International Telecommunication Union, Jul. 2001, 74 Pages.

ITU-T H.264, Series H: Audiovisual and Multimedia Systems, Infrastructure of audiovisual services—Coding of moving video, Advanced video coding for generic audiovisual services, Mar. 2005, 343 pp.

(56) References Cited

OTHER PUBLICATIONS

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of Audiovisual Services—Coding of Moving Video, High Efficiency Video Coding, The International Telecommunication Union, Apr. 2013, 317 Pages.
ITU-T H.265, Series H: Audiovisual and Multimedia Systems, Infrastructure of audiovisual services—Coding of moving video, Advanced video coding for generic audiovisual services, The International Telecommunication Union. Dec. 2016, 664 pp.
"ITU-T H.265, Series H: Audiovisual and Multimedia Systems, Infrastructure of audiovisual services—Coding of moving video, High efficiency video coding," The International Telecommunication Union, Apr. 2015, 634 pp, please consider section 7.4.9.6 on p. 102, section 8.5.3.2.6 on p. 141, section 8.5.3.2.7 on pp. 141-145, and section 8.5.3.2.8 on p. 145.
ITU-T H.265, Series H: Audiovisual and Multimedia Systems, Infrastructure of audiovisual services—Coding of moving video, High efficiency video coding, The International Telecommunication Union, Oct. 2014, 540 pp.
Jain A.K., "A sinusoidal family of unitary transforms", IEEE Transactions on Pattern Analysis and Machine Intelligence, Oct. 1, 1979, pp. 356-365, IEEE Service Center, XP011242370, ISSN: 0162-8828.
JCT-VC, "Test Model under Consideration (Output Document draft000)," Document: JCTVC-B205, 2nd Meeting: Geneva, CH, Jul. 21-28, 2010 152 pages.
Jongho Kim et al., "Complexity Reduction Algorithm for Intra Mode Selection in H.264/AVC Video Coding", Advanced Concepts for Intelligent Vision Systems, Lecture Notes in Computer Science, Springer Berlin/Heidelberg, vol. 4179/2006, Oct. 4, 2006, pp. 454-465.
Joshi, R., et al., "CE7: Mode Dependent Intra Residual Coding," 5th Meeting, Mar. 16-23, 2011, Document: JCTVC-E098, 9 pages.
Kanumuri S., et al., "Enhancements to Intra Coding", 4. JCT-VC Meeting; 95. MPEG Meeting; Jan. 20, 2011-Jan. 28, 2011; Daegu; (Joint Collaborative Team on Video Coding of ISO/IEC JTC1/SC29/WG11 AND ITU-T SG.16); URL: http://wftp3.itu.int/av-arch/jctvc-site/, No. JCTVC-D235, Jan. 14, 2011, pp. 1-7, XP030008275, ISSN: 0000-0013.
Karczewicz M., et al., "Study of Coding Efficiency Improvements beyond HEVC", 113. MPEG Meeting; Oct. 19, 2015-Oct. 23, 2015; Geneva; (Motion Picture Expert Group or ISO/IEC JTC1/SC29/WG11), No. M37102, Oct. 15, 2015 (Oct. 15, 2015), 13 Pages, XP030065470, whole document.
Karczewicz M., "Improved Intra Coding", ITU—Telecommunications Standardization Sector Study Group 16 Question 6 Video Coding Experts Group (VCEG), VCEG-AF15, 32 Meeting: San Jose, USA, Apr. 20-21, 2007, pp. 1-4.
Karczewicz (Qualcomm) M., et al., "Video coding technology proposal by Qualcomm", 1. JCT-VC Meeting; JCTVC-A121, Apr. 15, 2010-Apr. 23, 2010; Dresden; (Joint Collaborative Team on Video Coding of ISO/IEC JTC1/SC29/WG11 and ITU-TSG.16); URL: http://wftp3.itu.int/av-arch/jctvc-site/, No. XP030007566, (May 18, 2010), pp. 1-24, XP030007567, ISSN: 0000-0049 p. 1 p. 12—p. 13, pp. 12-14.
Lee et al., "Adaptive Scanning for H.264/AVC Intra Coding," ETRI Journal, vol. 28, No. 5, pp. 668-671, Oct. 2006.
Lee S., et.al., "High-Efficiency Video Compression Framework Based on Flexible Unit Representation," Proceedings of the Second APSIPA Annual Summit and Conference, Dec. 17, 2010, pp. 623-631, [online], URL : http://www.apsipa.org/proceedings_2010/pdf/APSIPA124.pdf.
Li et al.,"Prediction Based Adaptive Transform Coefficients Scanning for Inter-Frame Video Coding," pp. 4205-4208 (2010).
Li X., et al., "Multi-Type-Tree", 4. JVET Meeting; Oct. 15, 2016-Oct. 21, 2016; Chengdu; (The Joint Video Exploration Team of ISO/IEC JTC1/SC29/WG11 and ITU-T SG.16); JVET-D0117R1, JVET, Chengdu, CN, vol. JVET-D0117R1, No. JVET-D0117r1, Oct. 20, 2016 (Oct. 20, 2016), pp. 1-3, XP030150367, Retrieved from the Internet: URL: http://phenix.int-evry.fr/jvet/ the whole document.
Lim S.-C., et al., "Rate-Distortion Optimized Adaptive Transform Coding," Optical Engineering, Aug. 2009, vol. 48, No. 8, pp. 087004-1-087004-14, 14 Pages.
Lorcy V., et al., "EE2: Adaptive Primary Transform Improvement", Joint Video Exploration Team (JVET) of ITU-T SG 16 WP 3 and ISO/IEC JTC 1/SC 29/WG 11, 4th Meeting, JVET-D0065, Oct. 5, 2016, XP030150298, URL: http://phenix.int-evry.fr/jvet/,,No. JVET-D0065, 7 pages.
Lorcy V., et al., "Proposed Improvements to the Adaptive Multiple Core Transform", 3rd JVET Meeting, Joint Video Exploration Team (JVET) of ITU-T SG 16 WP 3 and ISO/IEC JTC 1/SC 29/WG 11, JVET-C0022-V4, May 26, 2016-Jan. 6, 2016, May 27, 2016, URL: http://phenix.int-evry.fr/jvet/,No. JVET-C0022-v4, XP030150104, 4 pages.
Marpe D., et al., "Context-Based Adaptive Binary Arithmetic Coding in the H.264AVC Video Compression Standard", IEEE Transaction on Circuits and Systems for Video Technology, IEEE Service Center, Piscataway, NJ, US, vol. 13, No. 7, Jul. 1, 2003, pp. 620-636.
Marpe D., et al., "Transform Coding Using the Residual Quadtree (RQT)", Fraunhofer Heinrich Hertz Institute, 4 pages. URL: http://www.hhi.fraunhofer.de/fields-of-competence/image-processing/researchgroups/ image-video-coding/hevc-high-efficiency-video-coding/transform-coding-using-the-residual-quadtree-rqt.html ; [ Retrieved on Feb. 9, 2017].
Martucci S.A., et al., "Symmetric convolution and the discrete sine and cosine transforms," IEEE Transactions on Signal Processing, vol. 42, No. 5, May 1, 1994, pp. 1038-1051, IEEE Signal Processing Society, XP000863873.
McCann K., et al., "Samsung's Response to the Call for Proposals on Video Compression Technology," Joint Collaborative Team on Video Coding (JCT-VC) of ITU-T SG-16 WP3 and ISO/IEC JTC1/SC29/WG11, 1st meeting, Document: JCTVC-A124, Dresden, DE, Apr. 15-23, 2010, 42 pages.
Mrak, M. et al., "A context modeling algorithm and its application in video compression", Proceedings International Conference on Image Processing (ICIP), Sep. 14, 2003, pp. 845-848, vol. 3, IEEE, XP010669966, ISBN: 978-0-7803-7750-9.
Pan et al., Fast Mode Decision Algorithm for Intraprediction in H.264/AVC Video Coding pp. 813-822 (2005).
Partial International Search Report—PCT/US2016/014898—ISA/EPO—dated May 2, 2016 12 pages.
Ragip Kurceren, et al., "Improvements on CABAC," ITU—Telecommunications Standardization Sector Study Group 16 Question 6 Video Coding Experts Group (VCEG), VCEG-024, 15th Meeting: Pattaya, Thailand, Dec. 4-6, 2001, pp. 1-4.
Response to Written Opinion dated Jul. 12, 2016, from International Application No. PCT/US2016/014898, filed on Nov. 18, 2016, 41 pages.
Richardson I.E.G., "H264/MPEG-4 Part 10 White Paper—Prediction of Intra Macroblocks", Internet Citation, XP02281494, Apr. 2003, pp. 1-6, Retrieved from the Internet: URL: http://www.vcodex.com/h264.html/h264_intrapred.pdf [retrieved on May 24, 2004].
Robert, et al.: "Improving Intra mode coding in H.264/AVC through block oriented transforms," 2006 IEEE 8th Workshop on Multimedia Signal Processing, pp. 382-386. Oct. 3-6, 2006.
Rosewarne C., et al., "CE6-Related: EMT Signalling", 11. JVET Meeting; Jul. 11, 2018-Jul. 18, 2018; Ljubljana; (The Joint Video Exploration Team of ISO/IEC JTC1/SC29/WG11 and ITU-T SG.16), No. JVET-K0113, Jul. 2, 2018 (Jul. 2, 2018), pp. 1-2, XP030198670, Retrieved from the Internet: URL: http://phenix.int-evry.fr/jvet/doc_end_user/documents/11_Ljubljana/wg11/JVET-K0113-v1.zip [retrieved on Jul. 2, 2018] p. 4-p. 6; table 1, Adaptive Multiple Core Transform; p. 28, paragraph 2.4—p. 31, paragraph 2.4.3.1; figure 25; tables 5,6.

(56) References Cited

OTHER PUBLICATIONS

Said Amir, "Introduction to Arithmetic Coding—Theory and Practice", Technical Report, Apr. 21, 2004, pp. 1-67, Retrieved from the Internet: URL: http://www.hpl.hp.com/techreports/2004/HPL-2004-76.pdf.

Saito S., et al., "HD-SDI H.264 Very low delay encoder/decoder device 'EHH-1000E/D' and its application," Image Information Industrial, Feb. 2009, Issue vol. 41, No. 2, Sangyo Kaihatsukiko Inc., Feb. 1, 2009, pp. 15-20.

Saxena A., et al., "DCT/DST-Based Transform Coding for Intra Prediction in Image/Video Coding," IEEE Transactions on Image Processing, Oct. 2013, vol. 22, Issue 10, pp. 3974-3981.

Saxena et al., "Jointly optimal intra prediction and adaptive primary transform", 3. JCT-VC Meeting; 94. Mpeg Meeting; Oct. 7, 2010-Oct. 15, 2010; Guangzhou; (Joint Collaborative Team on Video Coding of ISO /IECJTC1/SC29/WG11 and ITU-T 56.16); URL: http://wftp3.itu.int/av-arch/jctvc-site/, No. JCTVC-C108, Oct. 2, 2010 (2010-18-82), 21 Pages, XP030007815, ISSN: 0000-0045.

Second Written Opinion from International Application No. PCT/US2016/014898, dated Feb. 28, 2017, 11 pages.

Sekiguchi, et al.: "Results of CE on Separate Prediction Modes for 4:4:4 Coding (CE9)," Joint Video Team (JVT) of ISO/IEC MPEG & ITU-T VCEG, (ISO/IEC JTC1/SC29/WG11 and ITU-T SG16 Q.6), Document No. JVT-R031, pp. 1-28, 18th Meeting: Bangkok, TH, Source: Mitsubishi Electric Corporation, Jan. 14-20, 2006.

Seregin V., et al., "Low-complexity adaptive coefficients scanning", 94. MPEG Meeting; Oct. 11, 2010-Oct. 15, 2010; Guangzhou; (Motion Picture Expert Group OR ISO/IEC JTC1/SC29/WG11), JCTVC-C205,No. M18243, Oct. 28, 2010 (Oct. 28, 2010), XP030046833, pp. 1-4.

Sezer et al., "Robust Learning of 2-D Separable Transforms for Next-Generation Video Coding," Mitsubishi Electric Research Laboratories, Inc., Cambridge, MA, Mar. 2011, 12 pages.

Shiodera, et al., "Bidirectional Intra Prediction," ITU-T Q.6/SG16 VCEG, VCEG-AE14, Marrakech, Morocco, Jan. 2007, 6 pages.

Sohn Y., et al., "One Dimensional Transform for H.264 Based Intra Coding (Abstract)", 26. Picture Coding Symposium; Nov. 7, 2007-Nov. 9, 2007; Lisbon, 4 Pages, XP030080458, Nov. 7, 2007 (Nov. 7, 2007).

Srinivasan S., et al., "An introduction to HD Photo Technical Design," MPEG document No. wg1n4184m, Apr. 2007, 15 pp.

Suzuki, et al., "Description of Video Coding Technology Proposal by Sony," Joint Collaborative Team on Video Coding (JCT-VC) of ITU-T SG16 WP3 and ISO/IEC JTC1/SC29/WG11, Document JCTVC-A103, 1st Meeting: Dresden, DE, Apr. 15-23, 2010, 51 pp.

Suzuki Y., "Recent Trend of MPEG-4 Visual," Technical Report of the Information Processing Society of Japan (IPSJ), vol. 2004, No. 25 (2004-AVM-44), IPSJ, Mar. 5, 2004, pp. 85-90, ISSN: 0919-6072.

T Shiodera, et al., Simulation Results of Bidirectional Intra Prediction on KTA software version 13 ITU-T Q6/SG16 VCEG, VCEG-AF06, San Jose, USA, pp. 1-4, Apr. 2007.

Tan, et al.: "Spatially Compensated Block-Based Transform," Proceedings of the Seventh IASTED International Conference Signal and Image Processing, pp. 92-97, XP008097050, Aug. 15, 2005.

"Text of ISO/ IEC 14496-10 FCD Advanced Video Coding" Video Standards and Drafts, H.264, ISO/IEC 14496-10 AVC, various authors, No. N4920, Aug. 11, 2002 (Aug. 11, 2002), 207 Pages, XP030012343, Section 9.1.5.1, p. 83 with figure 9-1.

V.I. Pershikov, V.M. Savinkov, "Tolkovy Slovar po Informatike" (The Explanatory Dictionary of Informatics), Moscow, Finances and Statistics Publishing House, 1995, 6 Pages, p. 425.

Wang, et al., "A fast transform domain based algorithm for H.264/AVC intra prediction", 2007 IEEE International Conference on Multimedia and Expo, Beijing, CN, Jul. 2-5, 2007, pp. 1563-1566.

Wang Y-K., et al., "High Efficiency Video Coding (HEVC) Defect Report", 14. JCT-VC Meeting; Jul. 25, 2013-Aug. 2, 2013; Vienna; (Joint Collaborative Team on Video Coding of ISO/IEC JTC1/SC29/WG11 and ITU-TSG.16); URL: http://wftp3.itu.int/av-arch/jctvc-site/, No. JCTVC-N1003, Sep. 27, 2013 (Sep. 27, 2013), 311 Pages, XP030114947.

Wiegand, T., et al., "WD2: Working Draft 2 of High-Efficiency Video Coding", Jan. 28, 2011, No. JCTVC-D503, Jan. 28, 2011 (Jan. 28, 2011), XP002679642, Retrieved from the Internet: URL: http://wftp3.itu.int/av-arch/jctvc-site/2011_01_D_Daegu/ [retrieved on Jul. 11, 2012], 153 pp.

Wiegand T., et al.,"WD1: Working Draft 1 of High-Efficiency Video Coding", JCTVC-C403, Joint Collaborative Team on Video Coding (JCT-VC), of ITU-T SG16 WP3 and ISO/IEC JTC1/SC29/WG11, 3rd Meeting: Guangzhou, CN, Oct. 7-15, 2010, 137 pp.

Wiegand, "Text of Committee Draft of Joint Video Specification", Draft VCEG-P07, Joint Video Team (JVT) of ISO/IEC MPEG and ITU-T VCEG, JVT-C167, 3rd Meeting: Fairfax, Virginia, USA, May 6-10, 2002, 141 pages.

Wiegand T., et al., "WD3: Working Draft 3 of High-Efficiency Video Coding", Joint Collaborative Team on Video Coding (JCT-VC) of ITU-T SG16 WP3 and ISO/IEC JTC1/SC29/WG11, Document JCTVC-E603, 5th Meeting, Geneva, CH, Mar. 16-23, 2011, 239 pages.

Wien M, "High Efficiency Video Coding, Coding Tools and specification", Chapters, 2015, pp. 133-160.

Witten I.A., et al., "Arithmetic Coding for Data Compression", Communications of the ACM, vol. 30, No. 6, Jun. 1987, pp. 520-540.

Xu J., et al., "An Overview of Directional Transforms in Image Coding", Circuits and Systems (ISCAS), Proceedings of 2010 IEEE International Symposium on, May 30, 2010-Jun. 2, 2010, pp. 3036-3039.

Yan Ye and Marta Karczewicz, "Complexity Analysis of Improved Intra Coding", ITU—Telecommunications Standardization Sector Study Group 16 Question 6 Video Coding Experts Group (VCEG), 34th Meeting: Antalya Turkey, Jan. 2008, VCEG-AH20, pp. 1-6.

Ye Y., et al., "Improved H.264 Intra Coding Based on Bi-Directional Intra Prediction, Directional Transform, and Adaptive Coefficient Scanning", 15th IEEE International Conference on Image Processing, 2008. ICIP 2008, Oct. 2008, pp. 2116-2119.

Ye Y. et al., "Improved intra coding", 33. VCEG Meeting; 82. MPEG Meeting; Oct. 20, 2007-Oct. 20, 2007; Shenzhen; (Video Coding Experts Group of ITU-T SG.16), No. VCEG-AG11, Oct. 20, 2007, 6 Pages, XP030003615, ISSN: 0000-0095.

Yeo C., et al., "Mode-Dependent Transforms for Coding Directional Intra Prediction Residuals," IEEE Transactions on Circuits and Systems for Video Technology, Apr. 2012, vol. 22, No. 4, pp. 545-554.

Yeo C., et.al., "Choice of Transforms in MDDT for Unified Intra Prediction," [online], Joint Collaborative Team on Video Coding (JCT-VC) of ITU-T SG16 WP3 and ISO/IEC JTC1/SC29/WG11, Oct. 2, 2010, Document: JCTVC-C039 (version 1), URL : http://phenix.it-sudparis.eu/jct/doc_end_user/documents/3_Guangzhou/wg11/JCTVC-C039-m18060-v1-JCTVC-C039.zip, pp. 1-4.

Yeo C., et.al., "Mode-Dependent Fast Separable KLT for Block-based Intra Coding," [online] Joint Collaborative Team on Video Coding (JCT-VC) of ITU-T SG16 WP3 and ISO/IEC JTC1/SC29/WG11, Jul. 28, 2010, Document: JCTVC-B024, URL : http://phenix.it-sudparis.eu/jct/doc_end_user/documents/2_Geneva/wg11/JCTVC-B024.zip.

Yeo et al., "TE7: Results for Mode-Dependent Fast Separable KLT for Block-based Intra Coding," Joint Collaborative Team on Video Coding (JCT-VC), of ITU-T SG16 WP3 and ISO/IEC JTC1/SC29/WG11 , 3rd Meeting: Guangzhou, CN, Oct. 7-15, 2010, Document: JCTVC-C037, 4 pp.

Yu, et al.: "Low Complexity Intra Prediction," ITU-Telecommunications Standardization Sector, Study Group 16, Question 6, Video Coding Experts Group (VCEG), Document No. VCEG-Z14r1, pp. 1-4, 26th Meeting: Busan, KR, Apr. 16-22, 2005.

Zeng B., et al., "Directional Discrete Cosine Transforms for Image Coding", IEEE International Conference on Multimedia and Expo (ICME 2006), Jul. 1, 2006, pp. 721-724, IEEE, XP031032937, ISBN: 978-1-4244-0366-0.

Zhang et al., "Enhanced Intra Prediction and Transform for Video Coding", 2010 17th IEEE International Conference on Image Pro-

(56) References Cited

OTHER PUBLICATIONS cessing (ICIP 2010), Hong Kong, Sep. 26-29, 2010, IEEE, Sep. 26, 2010 (Sep. 26, 2010), pp. 3381-3384, XP031814166, ISBN: 978-1-4244-7992-4.
Zhang, P., et al., "Multiple modes intra-prediction in intra coding," Multimedia and Expo, 2004. ICME '04.2004 IEEE International Conference on Taipei, Taiwan Jun. 27-30, 2004, Piscataway, NJ, USA, IEEE,vol. 1, Jun. 27, 2004, pp. 419-422.
Zhao X., et al., "Enhanced Multiple Transform for Video Coding", Data Compression Conference, Mar. 30, 2016, XP033027689, DOI: 10.1109/DCC.2016.9 [retrieved on Dec. 15, 2016], pp. 73-82.
Zhao X., et al., "Video Coding with Rate-Distortion Optimizer Transform," IEEE Transactions on Circuits and Systems for Video Technology, vol. 22, No. 1, Jan. 2012, pp. 138-151.
Zhao X., et al., "Rate-distortion optimized transform for intra-frame coding", Acoustics Speech and Signal Processing (ICASSP) , 2010 IEEE International Conference on, IEEE, Piscataway, NJ, USA, Mar. 14, 2010 (Mar. 14, 2010), pp. 1414-1417, XP031743031, ISBN: 978-1-4244-4295-9 the whole document.
Zheng Y., et al., "CE11: Mode Dependent Coefficient Scanning", 4. JCT-VC Meeting; 95. MPEG Meeting; Jan. 20, 2011-Jan. 28, 2011; Daegu; (Joint Collaborative Team on Video Coding of ISO/IEC JTC1/SC29/WG11 AND ITU-T SG.16); No. JCTVC-D393, Jan. 16, 2011, pp. 1-4, XP030008432, ISSN: 0000-0013, URL: http://wftp3.itu.int/av-arch/jctvc-site.
Zou F., et al., "Rate-Distortion Optimized Transforms Based on the Lloyd-Type Algorithm for Intra Block Coding," IEEE Journal of Selected Topics in Signal Processing, Dec. 2013, vol. 7, Issue 6, pp. 1072-1083.
Advanced Video Coding for Generic Audiovisual Services, ITU-T Standard Pre-Published (P), International Telecommunication Union, Geneva, N. H264 3/5, Mar. 1, 2005, XP002448756.
An, et al., "Non-CE7: Boundary-Dependent Transform for Inter-Predicted Residue," JCTVCG281, JCT-VC Meeting Joint Collaborative Team on Video Coding (JCT-VC), of ITU-T SG16 WP3 and ISO/IEC JTC1/SC29/WG11; Nov. 21-30, 2011; document No. JCTVC-G281_r1, Nov. 22, 2011, 11 pp.
Anonymous: "Content of srccode.zip of JVET-C0022-v4.zip," May 19, 2016, XP055482606, [retrieved on Jun. 8, 2018].
Anonymous: "Test Model under Consideration", Joint Collaborative Team on Video Coding (JCT-VC) of ITU-T SG16 WP3 and ISO/IEC JTC1/SC29/WG11, Document: JCTVC-B205, Status: Output Document (draft000), Jul. 2010, pp. 1-153 (1-4, 18-21, 42-47, 142), Internet: URL:http://phenix.int-evry.fr/jct/doc_end_user/documents/20_Geneva/wg11/JCTVC-B205.zip.
Bross, et al., "High efficiency video coding (HEVC) text specification draft 6," Joint Collaborative Team on Video Coding (JCT-VC) of ITU-T SG16 WP3 and ISO/IEC JTC1/SC29/WG11 JCTVC-H1003, 7th Meeting: Geneva, CH, Nov. 21-30, 2011, pp. 259.

Draft ISO/IEC 14496-10: 2002(E) Section 9.1.5.1; "Text of Final Committee Draft of Joint Video Specification (ITU-T Rec, H.264, ISO/IEC 14496-10 AVC)," International Organisation for Standardisation Organisation Internatonale de Normalisation, ISO/IEC JTC1/SC29/WG11 Coding of Moving Pictures and Audio, MPEG02/N4920, p. 83 with figure 9-1, Editor Thomas Wiegand, Klagenfurt, AT, Jul. 2002.
ITU-T Telecommunication Standardization Sector of ITU: H.264 Series H: Audiovisual and Multimedia Systems, Infrastructure of audiovisual services—Coding of moving video—Advanced video coding for generic audiovisual services—May 2003, pp. 1-24.
Korean Patent Abstracts, Jeong, Je-Chang and Kim, Dong-Hyung, "Apparatus and method for fast mode selection", XP002660082 abstract & KR100865690 B1 (IUCF HYU [KR]) Oct. 28, 2008 (Oct. 28, 2008).
Wang Y-K. et al., "High Efficiency Video Coding (HEVC) Defect Report", Joint Collaborative Team on Video Coding (JCT-VC) of ITU-T SG 16 WP 3 and ISO/IEC JTC 1/SC 29/WG 11, Doc. JCTVC-N1003_v1, 14th Meeting, Vienna, AT, Jul. 25-Aug. 2, 2013, 311 pages, please consider section 8.5.3.2 6 on p. 125, section 8.5.3.2 7 on pp. 126-129, and section 8.5.3.2 8 on pp. 129 and 130.
Wiegand, et al.: "Working Draft No. 2, Revision 4 (WD-2 rev 4) Draft ISO/IEC 14496-10: 2002(E)," Joint Video Team (JVT) of ISO/IEC MPEG and ITU-T VCEG, Document No. JVT-B118r4, pp. 1-130, Geneva, Switzerland, Jan. 29-Feb. 1, 2002.
Xu, et al.: "Lifting-Based Directional DCT-Like Transform for Image Coding," IEEE International Conference on Image Processing (ICIP) 2007, vol. 3, pp. III-185-III-188.
Ye, et al., "Improved Intra Coding," ITU-T Q.6/SG16 VCEG, C257, Geneva, Switzerland, Jun. 2007, 4 pages.
Yeo, et al., "Mode-Dependent Transforms for Coding Directional Intra Prediction Residuals," IEEE Transactions on circuits and Systems for Video Technology, vol. 22, No. 4, Apr. 2012, pp. 545-554.
Yu L, Feng Y.: "Low-complexity intra prediction" Video Standards and Drafts, No. VCEG-Z14r1, Apr. 18, 2005 (Apr. 18, 2005), XP030003459.
Bossen F., et al., "JVET Common test Conditions and Software Reference Configurations for SDR Video", Joint Video Experts Team (JVET) of ITU-T SG 16 WP 3 and ISO/IEC JTC 1/SC 29/WG 11, Document: JVET-L1010-v1, 12th Meeting: Macao, CN, Oct. 3-12, 2018, pp. 1-5.
JVET: "VTM-3.0, Tags, JVET/VVCSoftware_VTM, GitLab", Frank Bossen, https://vcgit.hhi.fraunhofer.de/jvet/VVCSoftware_VTM/-/tags/VTM-3.0, Accessed Jan. 2019, pp. 1-2.
Said A., et al., "Description of Core Experiment 6 (CE6): Transforms and Transform Signalling", JVET-L1026-v3, Joint Video Experts Team (JVET) of ITU-T SG 16 WP 3 and ISO/IEC JTC 1/SC 29/WG 11, JVET-L1026-V3, 12th Meeting: Macao, CN, Oct. 3-12, 2018, pp. 1-14.

\* cited by examiner

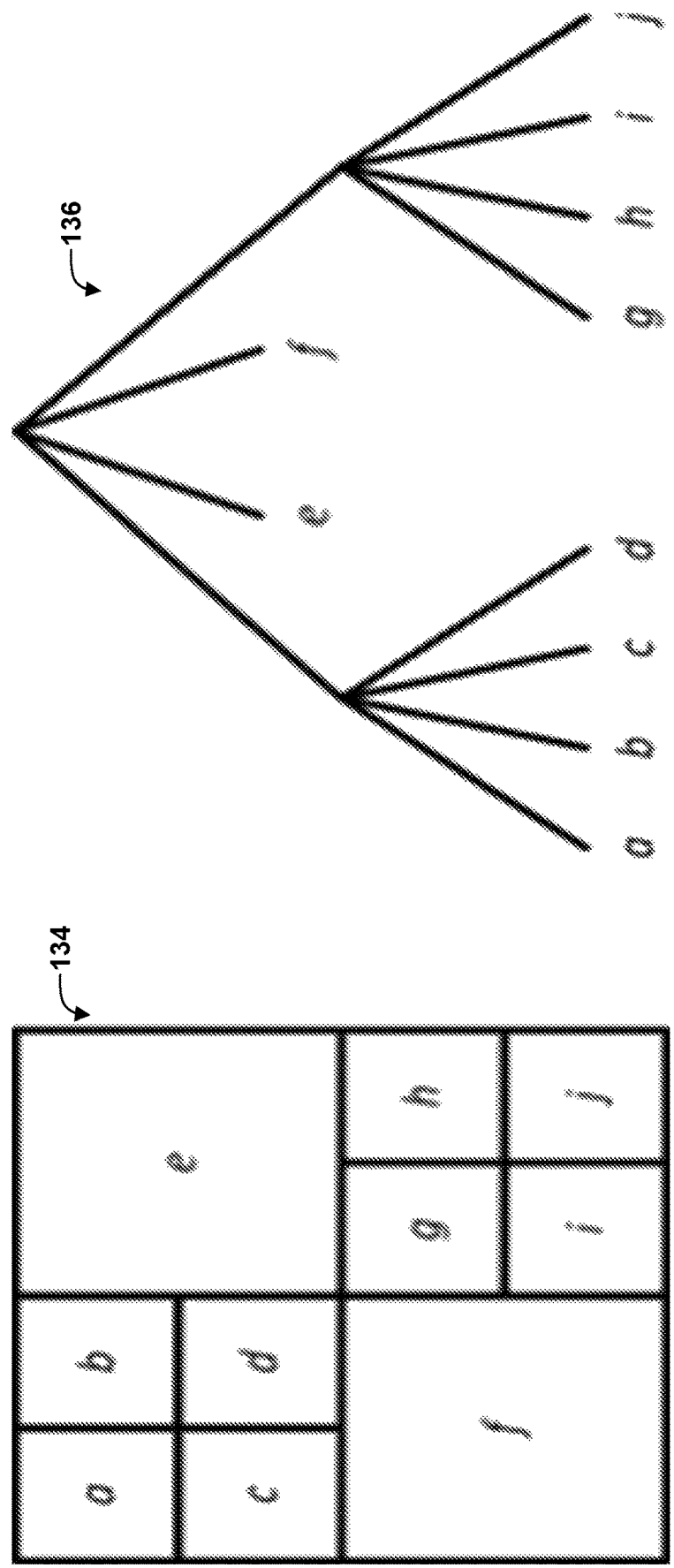

TREE-BASED TRANSFORM UNIT (TU) PARTITION FOR VIDEO CODING

This application claims the benefit of U.S. Provisional Application No. 62/782,292, filed Dec. 19, 2018, which is hereby incorporated by reference in its entirety.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques related to transform coding, which is an element of modern video compression standards. The example techniques may provide more flexible partitioning of residual blocks such as transform units (TUs) and may improve coding gains.

In one example, a method of decoding video data includes receiving, in a bitstream that comprises an encoded representation of the video data, information indicative of whether a residual block is partitioned and information indicative of a partition tree type for the residual block based on the residual block being partitioned, wherein the residual block is indicative of a difference between a current block and a prediction block. The method further includes determining, based on the received information that the residual block is partitioned and the partition tree type for the residual block, a plurality of residual sub-blocks into which the residual block is partitioned according to the partition tree type. The method further includes producing the residual data for the current block based at least in part on the residual block being partitioned according to the partition tree type into the plurality of residual sub-blocks. The method further includes decoding the current block using the residual data.

In another example, a device for decoding video data includes a memory configured to store video data. The device further includes a processor implemented in circuitry and configured to: receive, in a bitstream that comprises an encoded representation of the video data, information indicative of whether a residual block is partitioned and information indicative of a partition tree type for the residual block based on the residual block being partitioned, wherein the residual block is indicative of a difference between a current block and a prediction block; determine, based on the received information that the residual block is partitioned and the partition tree type for the residual block, a plurality of residual sub-blocks into which the residual block is partitioned according to the partition tree type; produce the residual data for the current block based at least in part on the residual block being partitioned according to the partition tree type into the plurality of residual sub-blocks; and decode the current block using the residual data.

In another example, a computer-readable storage medium having stored thereon instructions that, when executed, cause a processor to: receive, in a bitstream that comprises an encoded representation of video data, information indicative of whether a residual block is partitioned and information indicative of a partition tree type for the residual block based on the residual block being partitioned, wherein the residual block is indicative of a difference between a current block and a prediction block; determine, based on the received information that the residual block is partitioned and the partition tree type for the residual block, a plurality of residual sub-blocks into which the residual block is partitioned according to the partition tree type; produce the residual data for the current block based at least in part on the residual block being partitioned according to the partition tree type into the plurality of residual sub-blocks; and decode the current block using the residual data.

In another example, a device for decoding video data includes means for receiving, in a bitstream that comprises an encoded representation of the video data, information indicative of whether a residual block is partitioned and information indicative of a partition tree type for the residual block based on the residual block being partitioned, wherein the residual block is indicative of a difference between a current block and a prediction block. The device further includes means for determining, based on the received information that the residual block is partitioned and the partition tree type for the residual block, a plurality of residual sub-blocks into which the residual block is partitioned according to the partition tree type. The device further includes means for producing the residual data for the current block based at least in part on the residual block being partitioned according to the partition tree type into the plurality of residual sub-blocks. The device further includes means for decoding the current block using the residual data.

In another example, a method of encoding video data includes determining that a residual block for a current block of video data is partitioned according to a partition tree type into a plurality of residual sub-blocks. The method further includes encoding a bitstream as an encoded representation of video data that signals information indicative of whether the residual block is partitioned and further signals information indicative of the partition tree type for the residual block that is partitioned.

In another example, a device for encoding video data includes a memory configured to store video data. The device further includes a processor implemented in circuitry and configured to: determine that a residual block for a current block of the video data is partitioned according to a partition tree type into a plurality of residual sub-blocks; and encode a bitstream as an encoded representation of video data that signals information indicative of whether the residual block is partitioned and further signals information indicative of the partition tree type for the residual block that is partitioned.

The details of one or more examples are set forth in the accompanying drawings and the description below. Other features, objects, and advantages will be apparent from the description, drawings, and claims.

BRIEF DESCRIPTION OF DRAWINGS

FIGS. 3A and 3B are conceptual diagrams illustrating an example transform scheme based on a residual quadtree of HEVC.

DETAILED DESCRIPTION

Figure 1:
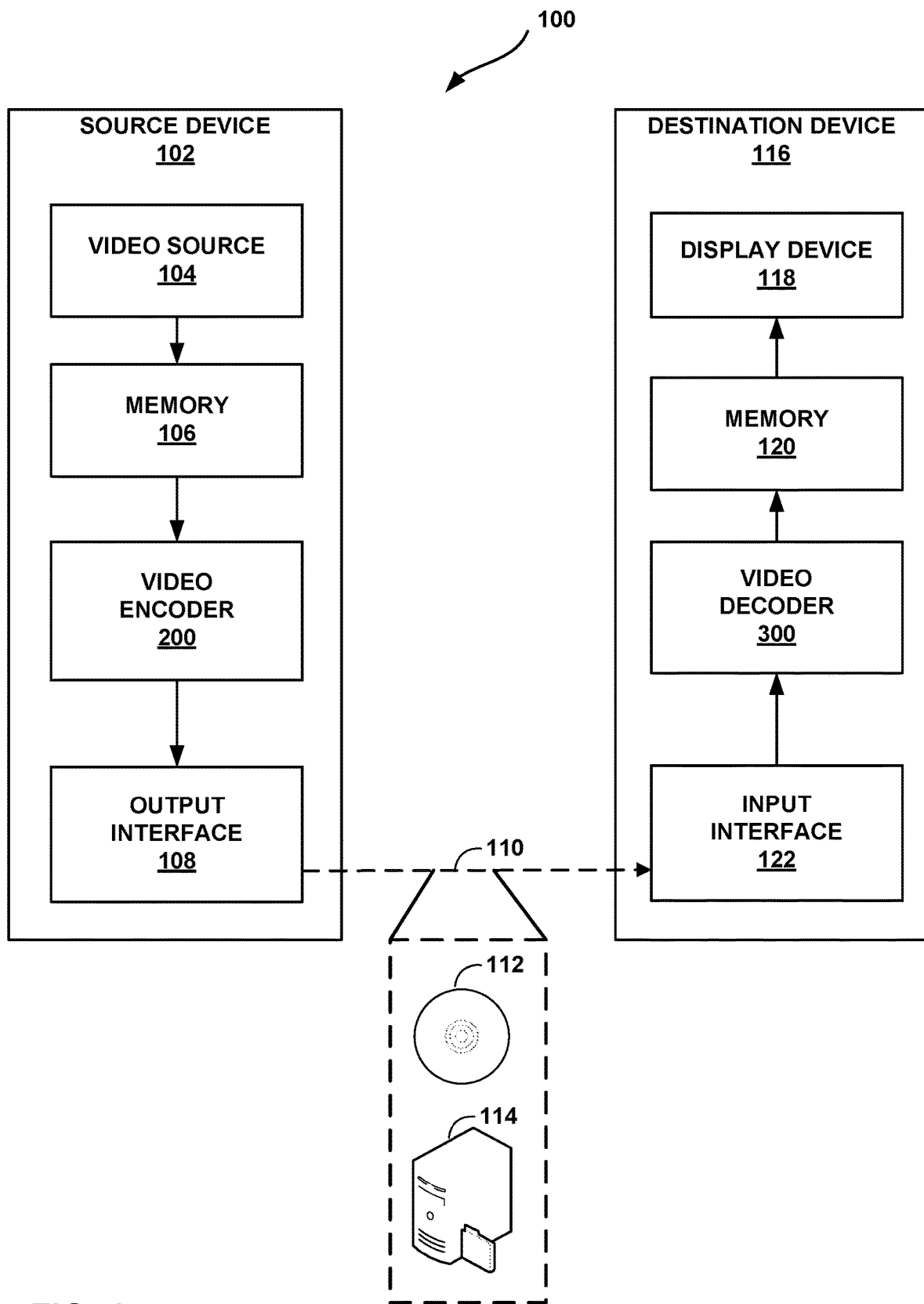
FIG. 1 is a block diagram illustrating an example video encoding and decoding system that may perform the techniques of this disclosure.

This disclosure relates to transform coding. In transform coding, for a video encoder there is a block of residual data (e.g., residual between current block being encoded and prediction block). The residual data is transformed from the spatial domain to a frequency domain resulting in a transform coefficient block of transform coefficients. The video decoder receives the transform coefficient block (or possibly a transform coefficient block after quantization) and performs inverse quantization (if needed) and inverse transform to reconstruct the residual data back to the spatial domain of values.

A transform unit (TU) includes a transform block of luma samples and transform blocks of corresponding chroma samples. A transform block may be a rectangular M×N block of samples resulting from a transform in the decoding process, and the transform may be a part of the decoding process by which a block of transform coefficients is converted to a block of spatial domain values. Accordingly, a residual block may be an example of a TU. The residual block may residual data transformed from sample domain to frequency domain and includes a plurality of transform coefficients. Transform coding is described in more detail in M. Wien, *High Efficiency Video Coding: Coding Tools and Specification*, Springer-Verlag, Berlin, 2015.

As described in more detail, in one or more examples described in this disclosure several tree-based partition designs can be used for transform coding with the transform scheme called adaptive multiple (or multi-core) transform (AMT) or multiple transform set (MTS). AMT and MTS may refer to the same transform tools as, due to a name change between video coding standards, AMT is now referred to as MTS.

Example transform schemes are described in U.S. Patent Publication No. 2016/0219290 and X. Zhao, S. Lee, J. Chen, L. Zhang, X. Li. Y Chen, M Karczewicz, and H. Liu, *Enhanced Multiple Transforms for Prediction Residuals*, January 2015, also in U.S. Patent Publication No. 2018/0020218 and X. Zhao, V. Seregin, M. Karczewicz, and J. Chen, *Improved Look-up Table for Enhanced Multiple Transform*, July 2016, and also in U.S. application Ser. No. 16/426,749, filed May 30, 2019 and H. E. Egilmez, Y.-H. Chao, A. Said, V. Seregin, and M Karczewicz, *Adaptive multiple transforms with reduced signaling overhead.*

As described in more detail, in some examples, a residual block may be partitioned into a plurality of residual sub-blocks (e.g., sub-TUs). This disclosure describes example techniques of ways in which a video encoder may signal, and a video decoder may determine that a residual block is partitioned into residual sub-blocks, and a manner in which the residual block is partitioned (e.g., partition type). Furthermore, there may be a plurality of transform types that the video encoder may utilize to transform the residual data in the sample domain into the frequency domain and a plurality of transform types that the video decoder may utilize to transform (e.g., inverse transform) the frequency domain data back to residual data in the sample domain. This disclosure describes example ways in which to determine the transform type.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for tree-based transform unit partition for video coding. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for tree-based transform unit partition for video coding. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as the Joint Exploration Test Model (JEM) or ITU-T H.266, also referred to as Versatile Video Coding (VVC). A draft of the VVC standard is described in Bross, et al. "Versatile Video Coding (Draft 6)," Joint Video Experts Team (JVET) of ITU-T SG 16 WP 3 and ISO/IEC JTC 1/SC 29/WG 11, 15$^{th}$ Meeting: Gothenburg, SE, 3-12 Jul. 2019, JVET-O2001-vE (hereinafter "VVC Draft 6"). A more recent draft of the VVC standard is described in Bross, et al. "Versatile Video Coding (Draft 7)," Joint Video Experts Team (JVET) of ITU-T SG 16 WP 3 and ISO/IEC JTC 1/SC 29/WG 11, 16$^{th}$ Meeting: Geneva, CH, 1-11 Oct. 2019, JVET-P2001-v9 (hereinafter "VVC Draft 7"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to JEM or VVC. According to JEM or VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. However, in some examples, TUs and CUs may be partitioned differently. That is, the TU may include a plurality of sub-TUs having a shape and size different than that of the CU. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of JEM and VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of JEM and VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. The result of the transform to the residual block may be a residual block in the transform domain (also called frequency domain). The residual block is an example of a TU, and in one or more examples, the TU may be further partitioned into a plurality of sub-TUs (e.g., residual sub-blocks).

As one example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms. The use of DCT is provided as one example and should not be considered limiting. There may be other transform types and the examples described in this disclosure may utilize one or more of the transform types. For example, video encoder 200 may be configured to select a transform type to use for transform from sample domain to transform (e.g., frequency) domain, and video decoder 300 may be configured to select a transform type to use for transform (e.g., inverse transform) from transform domain back to sample domain. In some examples, video encoder 200 may be configured to select and video decoder 300 may be configured to infer the transform type to use based on various criteria so that video encoder 200 and video decoder 300 select the same transform type. By inferring the transform type, video encoder 200 may not need to explicitly signal information indicative of the transform type and video decoder 300 may not need to receive information indicative of the transform type.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

In accordance with the techniques of this disclosure, a residual block (e.g., TU) may be partitioned to form a plurality of residual sub-blocks (e.g., sub-TUs). For example, a TU may be partitioned into one of: four square sub-TUs (such as quad tree partitioning), two rectangular sub-TUs (such as binary partitioning), or three rectangular sub-TUs (such as ternary partitioning). Another example may be a TU partitioned into four rectangular sub-TUs. Furthermore, there may be a plurality of different transform types (e.g., different types of discrete cosine transforms (DCTs) and discrete sine transforms (DSTs)).

This disclosure describes example ways in which video encoder 200 may signal and video decoder 300 may determine whether a residual block (e.g., TU) is partitioned and a manner in which the residual block is partitioned (e.g., determine a partition tree type). Also, this disclosure describes example ways in which to determine the transform type (also called transform kernel) to use.

For example, video decoder 300 may receive, in a bitstream that comprises an encoded representation of the video data, information indicative of whether a residual block is partitioned and information indicative of a partition tree type for the residual block based on the residual block being partitioned, wherein the residual block is indicative of a difference between a current block and a prediction block. Video decoder 300 may determine, based on the received information that the residual block is partitioned and the partition tree type for the residual block, a plurality of residual sub-blocks into which the residual block is partitioned according to the partition tree type. Video decoder 300 may produce the residual data for the current block based at least in part on the residual block being partitioned according to the partition tree type into the plurality of residual sub-blocks. Video decoder 300 may decoding the current block using the residual data.

In another example, video encoder 200 may determine that a residual block for a current block of video data is partitioned according to a partition tree type into a plurality of residual sub-blocks. Video encoder 200 may encode a bitstream as an encoded representation of video data that signals information indicative of whether the residual block is partitioned and further signals information indicative of the partition tree type for the residual block that is partitioned.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
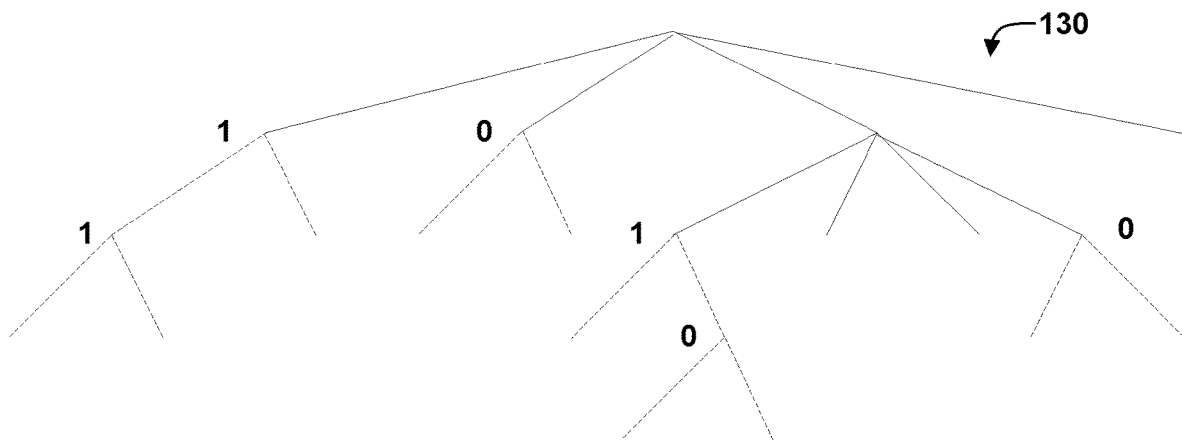
FIGS. 2A and 2B are conceptual diagrams illustrating an example quadtree binary tree (QTBT) structure, and a corresponding coding tree unit (CTU).
Figure 2B:
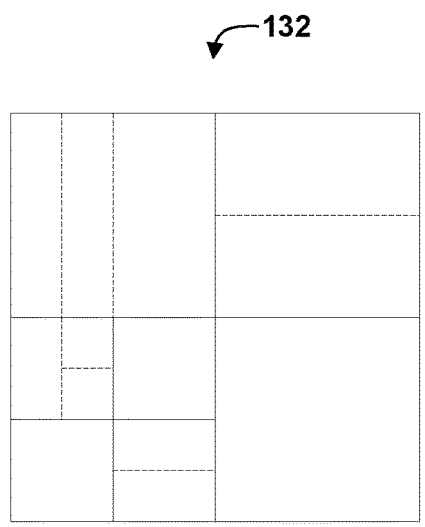

FIGS. 2A and 2B are conceptual diagrams illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, because quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), then the nodes can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, the leaf quadtree node will not be further split by the binary tree, because the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has a width equal to MinBTSize (4, in this example), it implies no further horizontal splitting is permitted. Similarly, a binary tree node having a height equal to MinBTSize implies no further vertical splitting is permitted for that binary tree node. As noted above, leaf nodes of the binary tree are referred to as CUs, and are further processed according to prediction and transform without further partitioning.

As described above, video encoder 200 may apply one or more transforms to the residual block, to produce transformed data in a transform domain instead of the sample domain (e.g., to generate a residual block in the transform domain). The following describes examples of transforms such as discrete sine transform (DST) and discrete cosine transform (DCT). The transform scheme used in HEVC is also described.

Transform indicates the process of deriving an alternative representation of the input signal. Given an N-point vector $x=[x_0, x_1, \ldots x_{N-1}]^T$ and a set of given vectors $\{\Phi_1, \Phi_1, \ldots, \Phi_{M-1}\}$, x can be approximated or exactly represented using a linear combination of $\Phi_0, \Phi_1, \ldots, \Phi_{M-1}$, which can be formulated as follows, $$\hat{x} = \sum_{i=0}^{M-1} f_i \cdot \phi_i$$

In the above, $\hat{x}$ can be an approximation or equivalent of x. Vector $f=[f_1, f_2, \ldots f_{M-1}]$ is called the transform coefficient vector and $\{\Phi_0, \Phi_1, \ldots \Phi_{M-1}\}$ are the transform basis vectors.

In the scenario of video coding, transform coefficients are roughly non-correlated and sparse. For example, the energy of the input vector x is compacted only on a few transform coefficients, and the remaining majority transform coefficients are typically close to 0.

The input data for transform used by video encoder 200 and video decoder 300 may be different. For instance, for video encoder 200, the input data that is transformed is residual data to generate transform coefficient block by converting spatial domain values of the residual into frequency domain values (e.g., coefficient values) of the transform coefficient block. For video decoder 300, the input data that is transformed is the transform coefficient block (e.g., possibly after dequantization) to generate the residual data by converting the frequency domain values of the transform coefficient block into spatial domain values of the residual. Because video decoder 300 performs the inverse of the process of video encoder 200, the transform performed by video decoder 300 may be considered as an inverse transform. For ease, the disclosure describes transforms of input data with the understanding that the input data is different for video encoder 200 and video decoder 300 and that the transform by video decoder 300 may be the inverse of the transform of video encoder 200.

Given the specific input data, the optimal transform in terms of energy compaction is the so-called Karhunen-Loeve transform (KLT), which uses the eigen vectors of the covariance matrix of the input data as the transform basis vectors. Therefore, KLT is a data-dependent transform and does not have a general mathematical formulation. However, under certain assumptions (e.g., such as where the input data forms a first-order stationary Markov processes), the corresponding KLT is actually a member of the sinusoidal family of unitary transforms, which is introduced in U.S. application Ser. No. 16/426,749, filed May 30, 2019 and H. E. Egilmez, Y.-H. Chao, A. Said, V. Seregin, and M Karczewicz, Adaptive multiple transforms with reduced signaling overhead. The sinusoidal family of unitary transforms indicates transforms using transform basis vectors formulated as follows:

$$\Phi_m(k) = A \cdot e^{ike} + B \cdot e^{-ike}$$

In the above, e is the base of the natural logarithm approximately equal to 2.71828, A, B, and θ are complex in general, and depend on the value of m.

Several well-known transforms including the discrete Fourier, cosine, sine, and the KLT (for first-order stationary Markov processes) are members of this sinusoidal family of unitary transforms. According to Jain, A. K., A sinusoidal family of unitary transforms, IEEE Trans. on Pattern Analysis and Machine Intelligence, 1, 356, 1979, the complete set of discrete cosine transform (DCT) and discrete sine transform (DST) families includes totally 16 transforms based on different types (i.e., different values of A, B, and θ), and a complete definition of the different types of DCT and DST are given below.

Assume the input N-point vector is denoted as $x=[x_0, x_1, \ldots x_{N-1}]^T$, and it is transformed to another N-point transform coefficient vector denoted as $y=[y_0, y_1, \ldots, y_{N-1}]^T$ by multiplying a matrix, the process of which can be further illustrated according to one of the following transform formulation, wherein k ranges from 0 through N-1, inclusive:

$$y_k = \sum_{n=0}^{N-1} \sqrt{\frac{2}{N-1}} \cos\left(\frac{\pi \cdot n \cdot k}{N-1}\right) \cdot w_0 \cdot w_1 \cdot x_n,$$ DCT Type-I (DCT-1)

where $w_0 = \begin{cases} \frac{1}{\sqrt{2}}, & \text{if } n=0 \text{ or } n=N-1 \\ 1, & \text{otheriwse} \end{cases}$, $w_1 = \begin{cases} \frac{1}{\sqrt{2}}, & \text{if } k=0 \text{ or } k=N-1 \\ 1 & \text{otheriwse} \end{cases}$ $$y_k = \sum_{n=0}^{N-1} \sqrt{\frac{2}{N}} \cos\left(\frac{\pi \cdot (n+0.5) \cdot k}{N-1}\right) \cdot w_0 \cdot x_n,$$ DCT Type-II (DCT-2)

where $w_0 = \begin{cases} \frac{1}{\sqrt{2}}, & \text{if } k=0 \\ 1, & \text{otheriwse} \end{cases}$, $$y_k = \sum_{n=0}^{N-1} \sqrt{\frac{2}{N}} \cos\left(\frac{\pi \cdot n \cdot (k+0.5)}{N-1}\right) \cdot w_0 \cdot x_n,$$ DCT Type-III (DCT-3)

where $w_0 = \begin{cases} \frac{1}{\sqrt{2}}, & \text{if } n=0 \\ 1, & \text{otheriwse} \end{cases}$, $$y_k = \sum_{n=0}^{N-1} \sqrt{\frac{2}{N}} \cos\left(\frac{\pi \cdot (n+0.5) \cdot (k+0.5)}{N}\right) \cdot x_n,$$ DCT Type-IV (DCT-4)

$y_k =$ DCT Type-V (DCT-5)

$$\sum_{n=0}^{N-1} \sqrt{\frac{2}{N-0.5}} \cos\left(\frac{\pi \cdot n \cdot k}{N-0.5}\right) \cdot w_0 \cdot w_1 \cdot x_n,$$

where $w_0 = \begin{cases} \frac{1}{\sqrt{2}}, & \text{if } n=0 \\ 1, & \text{otheriwse} \end{cases}$, $w_1 = \begin{cases} \frac{1}{\sqrt{2}}, & \text{if } k=0 \\ 1 & \text{otheriwse} \end{cases}$ -continued $$y_k = \sum_{n=0}^{N-1} \sqrt{\frac{2}{N-0.5}} \cos\left(\frac{\pi \cdot (n+0.5) \cdot k}{N-0.5}\right) \cdot w_0 \cdot w_1 \cdot x_n, \quad \text{DCT Type-VI (DCT-6)}$$

where $w_0 = \begin{cases} \frac{1}{\sqrt{2}}, & \text{if } n = N-1 \\ 1, & \text{otheriwse} \end{cases}$, $w_1 = \begin{cases} \frac{1}{\sqrt{2}}, & \text{if } k = 0 \\ 1, & \text{otheriwse} \end{cases}$ $$y_k = \sum_{n=0}^{N-1} \sqrt{\frac{2}{N-0.5}} \cos\left(\frac{\pi \cdot n \cdot (k+0.5)}{N-0.5}\right) \cdot w_0 \cdot w_1 \cdot x_n, \quad \text{DCT Type-VII (DCT-7)}$$

where $w_0 = \begin{cases} \frac{1}{\sqrt{2}}, & \text{if } n = 0 \\ 1, & \text{otheriwse} \end{cases}$, $w_1 = \begin{cases} \frac{1}{\sqrt{2}}, & \text{if } k = N-1 \\ 1, & \text{otheriwse} \end{cases}$ $$y_k = \sum_{n=0}^{N-1} \sqrt{\frac{2}{N+0.5}} \cos\left(\frac{\pi \cdot (n+0.5) \cdot (k+0.5)}{N+0.5}\right) \cdot x_n, \quad \text{DCT Type-VIII (DCT-8)}$$

$$y_k = \sum_{n=0}^{N-1} \sqrt{\frac{2}{N+1}} \sin\left(\frac{\pi \cdot (n+1) \cdot (k+1)}{N+1}\right) \cdot x_n, \quad \text{DST Type-I (DST-1)}$$

$$y_k = \sum_{n=0}^{N-1} \sqrt{\frac{2}{N}} \sin\left(\frac{\pi \cdot (n+0.5) \cdot (k+1)}{N}\right) \cdot w_0 \cdot x_n, \quad \text{DST Type-2 (DST-2)}$$

where $w_0 = \begin{cases} \frac{1}{\sqrt{2}}, & \text{if } k = N-1 \\ 1, & \text{otheriwse} \end{cases}$ $$y_k = \sum_{n=0}^{N-1} \sqrt{\frac{2}{N}} \sin\left(\frac{\pi \cdot (n+1) \cdot (k+0.5)}{N}\right) \cdot w_0 \cdot x_n, \quad \text{DST Type-III (DST-3)}$$

where $w_0 = \begin{cases} \frac{1}{\sqrt{2}}, & \text{if } k = N-1 \\ 1, & \text{otheriwse} \end{cases}$ $$y_k = \sum_{n=0}^{N-1} \sqrt{\frac{2}{N}} \sin\left(\frac{\pi \cdot (n+0.5) \cdot (k+0.5)}{N}\right) \cdot x_n, \quad \text{DST Type-IV (DST-4)}$$

$$y_k = \sum_{n=0}^{N-1} \sqrt{\frac{2}{N+0.5}} \sin\left(\frac{\pi \cdot (n+1) \cdot (k-1)}{N+0.5}\right) \cdot x_n, \quad \text{DST Type-V (DST-5)}$$

$$y_k = \sum_{n=0}^{N-1} \sqrt{\frac{2}{N+0.5}} \sin\left(\frac{\pi \cdot (n+0.5) \cdot (k+1)}{N+0.5}\right) \cdot x_n, \quad \text{DST Type-VI (DST-6)}$$

$$y_k = \sum_{n=0}^{N-1} \sqrt{\frac{2}{N+0.5}} \sin\left(\frac{\pi \cdot (n+1) \cdot (k+0.5)}{N+0.5}\right) \cdot x_n, \quad \text{DST Type-VII (DST-7)}$$

$$y_k = \sum_{n=0}^{N-1} \sqrt{\frac{2}{N-0.5}} \cos\left(\frac{\pi \cdot (n+0.5) \cdot (k+0.5)}{N-0.5}\right) \cdot w_0 \cdot w_1 \cdot x_n, \quad \text{DST Type-VIII (DCT-8)}$$

where $w_0 = \begin{cases} \frac{1}{\sqrt{2}}, & \text{if } n = N-1 \\ 1, & \text{otheriwse} \end{cases}$, $w_1 = \begin{cases} \frac{1}{\sqrt{2}}, & \text{if } k = N-1 \\ 1, & \text{otheriwse} \end{cases}$ The transform type is specified by the mathematical formulation of the transform basis function, e.g., 4-point DST-VII and 8-point DST-VII have the same transform type, regardless the value of N.

Without loss of generality, all the above transform types can be represented using the below generalized formulation:

$$y_m = \sum_{n=0}^{N-1} T_{m,n} x_n,$$

In the above equation, T is the transform matrix specified by the definition of one certain transform, e.g., DCT Type-I~DCT Type-VIII, or DST Type-I~DST Type-VIII, and the row vectors of T, e.g., $[T_{i,0}, T_{i,1}, T_{i,2}, \ldots, T_{i,N-1}]$ are the $i^{th}$ transform basis vectors. A transform applied on the N-point input vector is called an N-point transform.

It is also noted that, the above transform formulations, which are applied on the 1-D input data x, can be represented in matrix multiplication form as below $$y = T \cdot x$$

In the above equation, T indicates the transform matrix, x indicates the input data vector, and y indicates the output transform coefficients vector.

The following describes transform for 2-dimensional (2-D) input data. The transforms describe above may be applied on 1-D input data, and transforms can be also extended for 2-D input data sources. For example, suppose X is an input M×N data array. Some methods of applying transform on 2-D input data include the separable and non-separable 2-D transforms.

A separable 2-D transform applies 1-D transforms for the horizontal and vertical vectors of X sequentially, formulated as below:

$$Y = C \cdot X \cdot R^T$$

In the above equation, C and R denotes the given M×M and N×N transform matrices, respectively. From the formulation, C applies 1-D transforms for the column vectors of X, while R applies 1-D transforms for the row vectors of X. In this disclosure, for simplicity denote C and R as left (vertical) and right (horizontal) transforms and they both form a transform pair. There are cases when C is equal to R and is an orthogonal matrix. In such a case, the separable 2-D transform is determined by just one transform matrix.

A non-separable 2-D transform first reorganized all the elements of X into a single vector, namely X', by doing the following mathematical mapping as an example:

$$X_{(i\cdot N+j)}' = X_{i,j}$$

Then a 1-D transform T' is applied for X' as below:

$$Y = T' \cdot X$$

In the above equation, T' is an (M*N)×(M*N) transform matrix.

In video coding, separable 2-D transforms are always applied since 2-D transforms require much less operation (addition, multiplication) counts as compared to 1-D transform.

The following describes transform types applied in HEVC. In some video codecs, such as H.264/AVC, an integer approximation of the 4-point and 8-point Discrete Cosine Transform (DCT) Type-II is always applied for both Intra and Inter prediction residual. To better accommodate the various statistics of residual samples, more flexible types of transforms other than DCT Type-II are utilized in later generation video codec. For example, in HEVC, an integer approximation of the 4-point Type-VII Discrete Sine Transform (DST) is utilized for Intra prediction residual, which is both theoretically proved and experimentally validated, in S. A. Martucci, "Symmetric convolution and the discrete sine and cosine transforms," IEEE Trans. Sig. Processing SP-42, 1038-1051 (1994), that DST Type-VII is more efficient than DCT Type-II for residuals vectors generated along the Intra prediction directions (e.g., DST Type-VII is more efficient than DCT Type-II for row residual vectors generated by the horizontal Intra prediction direction). In HEVC, an integer approximation of 4-point DST Type-VII is applied only for 4×4 luma Intra prediction residual blocks. The 4-point DST-VII used in HEVC is shown below, 4×4 DST-VII:
{29, 55, 74, 84}
{74, 74, 0, −74}
{84, −29, −74, 55}
{55, −84, 74, −29}

In HEVC, for residual blocks that are not 4×4 luma Intra prediction residual blocks, integer approximations of the 4-point, 8-point, 16-point and 32-point DCT Type-II are also applied, as shown below:

4-point DCT-II:
{64, 64, 64, 64}
{83, 36, −36, −83}
{64, −64, −64, 64}
{36, −83, 83, −36}

8-point DCT-II:
{64, 64, 64, 64, 64, 64, 64, 64}
{89, 75, 50, 18, −18, −50, −75, −89}
{83, 36, −36, −83, −83, −36, 36, 83}
{75, −18, −89, −50, 50, 89, 18, −75}
{64, −64, −64, 64, 64, −64, −64, 64}
{50, −89, 18, 75, −75, −18, 89, −50}
{36, −83, 83, −36, −36, 83, −83, 36}
{18, −50, 75, −89, 89, −75, 50, −18}

16-point DCT-II:
{64, 64, 64, 64, 64, 64, 64, 64, 64, 64, 64, 64, 64, 64, 64, 64}
{90, 87, 80, 70, 57, 43, 25, 9, −9, −25, −43, −57, −70, −80, −87, −90}
{89, 75, 50, 18, −18, −50, −75, −89, −89, −75, −50, −18, 18, 50, 75, 89}
{87, 57, 9, −43, −80, −90, −70, −25, 25, 70, 90, 80, 43, −9, −57, −87}
{83, 36, −36, −83, −83, −36, 36, 83, 83, 36, −36, −83, −83, −36, 36, 83}
{80, 9, −70, −87, −25, 57, 90, 43, −43, −90, −57, 25, 87, 70, −9, −80}
{75, −18, −89, −50, 50, 89, 18, −75, −75, 18, 89, 50, −50, −89, −18, 75}
{70, −43, −87, 9, 90, 25, −80, −57, 57, 80, −25, −90, −9, 87, 43, −70}
{64, −64, −64, 64, 64, −64, −64, 64, 64, −64, −64, 64, 64, −64, −64, 64}
{57, −80, −25, 90, −9, −87, 43, 70, −70, −43, 87, 9, −90, 25, 80, −57}
{50, −89, 18, 75, −75, −18, 89, −50, −50, 89, −18, −75, 75, 18, −89, 50}
{43, −90, 57, 25, −87, 70, 9, −80, 80, −9, −70, 87, −25, −57, 90, −43}
{36, −83, 83, −36, −36, 83, −83, 36, 36, −83, 83, −36, −36, 83, −83, 36}
{25, −70, 90, −80, 43, 9, −57, 87, −87, 57, −9, −43, 80, −90, 70, −25}
{18, −50, 75, −89, 89, −75, 50, −18, −18, 50, −75, 89, −89, 75, −50, 18}
{9, −25, 43, −57, 70, −80, 87, −90, 90, −87, 80, −70, 57, −43, 25, −9}

32-point DCT-II:
{64, 64, 64, 64, 64, 64, 64, 64, 64, 64, 64, 64, 64, 64, 64, 64, 64, 64, 64, 64, 64, 64, 64, 64, 64, 64, 64, 64, 6, 64, 64, 64, 64}
{90, 90, 88, 85, 82, 78, 73, 67, 61, 54, 46, 38, 31, 22, 13, 4, −4, −13, −22, −31, −38, −46, −54, −61, −67, −73, −78, −82, −85, −88, −90, −90}
{90, 87, 80, 70, 57, 43, 25, 9, −9, −25, −43, −57, −70, −80, −87, −90, −90, −87, −80, −70, −57, −43, −25, −9, 9, 25, 43, 57, 70, 80, 87, 90}
{90, 82, 67, 46, 22, −4, −31, −54, −73, −85, −90, −88, −78, −61, −38, −13, 13, 38, 61, 78, 88, 90, 85, 73, 54, 31, 4, −22, −46, −67, −82, −90}
{89, 75, 50, 18, −18, −50, −75, −89, −89, −75, −50, −18, 18, 50, 75, 89, 89, 75, 50, 18, −18, −50, −75, −89, −89, −75, −50, −18, 18, 50, 75, 89}
{88, 67, 31, −13, −54, −82, −90, −78, −46, −4, 38, 73, 90, 85, 61, 22, −22, −61, −85, −90, −73, −38, 4, 46, 78, 90, 82, 54, 13, −31, −67, −88}
{87, 57, 9, −43, −80, −90, −70, −25, 25, 70, 90, 80, 43, −9, −57, −87, −87, −57, −9, 43, 80, 90, 70, 25, −25, −70, −90, −80, −43, 9, 57, 87}
{85, 46, −13, −67, −90, −73, −22, 38, 82, 88, 54, −4, −61, −90, −78, −31, 31, 78, 90, 61, 4, −54, −88, −82, −38, 22, 73, 90, 67, 13, −46, −85}
{83, 36, −36, −83, −83, −36, 36, 83, 83, 36, −36, −83, −83, −36, 36, 83, 83, 36, −36, −83, −83, −36, 36, 83, 83, 36, −36, −83, −83, −36, 36, 83}
{82, 22, −54, −90, −61, 13, 78, 85, 31, −46, −90, −67, 4, 73, 88, 38, −38, −88, −73, −4, 67, 90, 46, −31, −85, −78, −13, 61, 90, 54, −22, −82}
{80, 9, −70, −87, −25, 57, 90, 43, −43, −90, −57, 25, 87, 70, −9, −80, −80, −9, 70, 87, 25, −57, −90, −43, 43, 90, 57, −25, −87, −70, 9, 80}
{78, −4, −82, −73, 13, 85, 67, −22, −88, −61, 31, 90, 54, −38, −90, −46, 46, 90, 38, −54, −90, −31, 61, 88, 22, −67, −85, −13, 73, 82, 4, −78}
{75, −18, −89, −50, 50, 89, 18, −75, −75, 18, 89, 50, −50, −89, −18, 75, 75, −18, −89, −50, 50, 89, 18, −75, −75, 18, 89, 50, −50, −89, −18, 75}
{73, −31, −90, −22, 78, 67, −38, −90, −13, 82, 61, −46, −88, −4, 85, 54, −54, −85, 4, 88, 46, −61, −82, 13, 90, 38, −67, −78, 22, 90, 31, −73}

{70, −43, −87, 9, 90, 25, −80, −57, 57, 80, −25, −90, −9, 87, 43, −70, −70, 43, 87, −9, −90, −25, 80, 57, −57, −80, 25, 90, 9, −87, −43, 70}
{67, −54, −78, 38, 85, −22, −90, 4, 90, 13, −88, −31, 82, 46, −73, −61, 61, 73, −46, −82, 31, 88, −13, −90, −4, 90, 22, −85, −38, 78, 54, −67}
{64, −64, −64, 64, 64, −64, −64, 64, 64, −64, −64, 64, 64, −64, −64, 64, 64, −64, −64, 64, 64, −64, −64, 64, 64, −64, −64, 64, 64, −64, −64, 64}
{61, −73, −46, 82, 31, −88, −13, 90, −4, −90, 22, 85, −38, −78, 54, 67, −67, −54, 78, 38, −85, −22, 90, 4, −90, 13, 88, −31, −82, 46, 73, −61}
{57, −80, −25, 90, −9, −87, 43, 70, −70, −43, 87, 9, −90, 25, 80, −57, −57, 80, 25, −90, 9, 87, −43, −70, 70, 43, −87, −9, 90, −25, −80, 57}
{54, −85, −4, 88, −46, −61, 82, 13, −90, 38, 67, −78, −22, 90, −31, −73, 73, 31, −90, 22, 78, −67, −38, 90, −13, −82, 61, 46, −88, 4, 85, −54}
{50, −89, 18, 75, −75, −18, 89, −50, −50, 89, −18, −75, 75, 18, −89, 50, 50, −89, 18, 75, −75, −18, 89, −50, −50, 89, −18, −75, 75, 18, −89, 50}
{46, −90, 38, 54, −90, 31, 61, −88, 22, 67, −85, 13, 73, −82, 4, 78, −78, −4, 82, −73, −13, 85, −67, −22, 88, −61, −31, 90, −54, −38, 90, −46}
{43, −90, 57, 25, −87, 70, 9, −80, 80, −9, −70, 87, −25, −57, 90, −43, −43, 90, −57, −25, 87, −70, −9, 80, −80, 9, 70, −87, 25, 57, −90, 43}
{38, −88, 73, −4, −67, 90, −46, −31, 85, −78, 13, 61, −90, 54, 22, −82, 82, −22, −54, 90, −61, −13, 78, −85, 31, 46, −90, 67, 4, −73, 88, −38}
{36, −83, 83, −36, −36, 83, −83, 36, 36, −83, 83, −36, −36, 83, −83, 36, 36, −83, 83, −36, −36, 83, −83, 36, 36, −83, 83, −36, −36, 83, −83, 36}
{31, −78, 90, −61, 4, 54, −88, 82, −38, −22, 73, −90, 67, −13, −46, 85, −85, 46, 13, −67, 90, −73, 22, 38, −82, 88, −54, −4, 61, −90, 78, −31}
{25, −70, 90, −80, 43, 9, −57, 87, −87, 57, −9, −43, 80, −90, 70, −25, −25, 70, −90, 80, −43, −9, 57, −87, 87, −57, 9, 43, −80, 90, −70, 25}
{22, −61, 85, −90, 73, −38, −4, 46, −78, 90, −82, 54, −13, −31, 67, −88, 88, −67, 31, 13, −54, 82, −90, 78, −46, 4, 38, −73, 90, −85, 61, −22}
{18, −50, 75, −89, 89, −75, 50, −18, −18, 50, −75, 89, −89, 75, −50, 18, 18, −50, 75, −89, 89, −75, 50, −18, −18, 50, −75, 89, −89, 75, −50, 18}
{13, −38, 61, −78, 88, −90, 85, −73, 54, −31, 4, 22, −46, 67, −82, 90, −90, 82, −67, 46, −22, −4, 31, −54, 73, −85, 90, −88, 78, −61, 38, −13}
{9, −25, 43, −57, 70, −80, 87, −90, 90, −87, 80, −70, 57, −43, 25, −9, −9, 25, −43, 57, −70, 80, −87, 90, −90, 87, −80, 70, −57, 43, −25, 9}
{4, −13, 22, −31, 38, −46, 54, −61, 67, −73, 78, −82, 85, −88, 90, −90, 90, −90, 88, −85, 82, −78, 73, −67, 61, −54, 46, −38, 31, −22, 13, −4}

FIGS. 3A and 3B are conceptual diagrams illustrating an example transform scheme based on a residual quadtree of HEVC. In HEVC, a transform coding structure using the residual quadtree (RQT) is applied to adapt various characteristics of residual blocks, which is briefly described in J. Han, A. Saxena and K. Rose, "Towards jointly optimal spatial prediction and adaptive transform in video/image coding," IEEE International Conference on Acoustics, Speech and Signal Processing (ICASSP), March 2010, pp. 726-729. Additional information about RQT is available at: http://www.hhi.fraunhofer.de/fields-of-competence/image-processing/research-groups/image-video-coding/hevc-high-efficiency-video-coding/transform-coding-using-the-residual-quadtree-rqt.html.

In RQT, each picture is divided into coding tree units (CTU), which are coded in raster scan order for a specific tile or slice. A CTU is a square block and represents the root of a quadtree, i.e., the coding tree. The CTU size may range from 8×8 to 64×64 luma samples, but typically 64×64 is used. Each CTU can be further split into smaller square blocks called coding units (CUs). After the CTU is split recursively into CUs, each CU is further divided into prediction units (PU) and transform units (TU). The partitioning of a CU into TUs is carried out recursively based on a quadtree approach, therefore the residual signal of each CU is coded by a tree structure namely, the residual quadtree (RQT). The RQT allows TU sizes from 4×4 up to 32×32 luma samples.

FIG. 3A depicts an example where CU 134 includes 10 TUs, labeled with the letters a to j, and the corresponding block partitioning. Each node of RQT 136 shown in FIG. 3B is actually a transform unit (TU) corresponding to FIG. 3A. The individual TUs are processed in depth-first tree traversal order, which is illustrated in FIG. 3A as alphabetical order, which follows a recursive Z-scan with depth-first traversal. The quadtree approach enables the adaptation of the transform to the varying space-frequency characteristics of the residual signal.

Typically, larger transform block sizes, which have larger spatial support, provide better frequency resolution. However, smaller transform block sizes, which have smaller spatial support, provide better spatial resolution. The trade-off between the two, spatial and frequency resolutions, is chosen by the encoder mode decision, for example based on rate-distortion optimization technique. The rate-distortion optimization technique calculates a weighted sum of coding bits and reconstruction distortion, i.e., the rate-distortion cost, for each coding mode (e.g., a specific RQT splitting structure), and select the coding mode with least rate-distortion cost as the best mode.

Three parameters are defined in the RQT: the maximum depth of the tree, the minimum allowed transform size and the maximum allowed transform size. The minimum and maximum transform sizes can vary within the range from 4×4 to 32×32 samples, which correspond to the supported block transforms mentioned in the previous paragraph. The maximum allowed depth of the RQT restricts the number of TUs. A maximum depth equal to zero means that a coding block (CB) cannot be split any further if each included TB reaches the maximum allowed transform size, e.g., 32×32.

All these parameters interact and influence the RQT structure. Consider a case, in which the root CB size is 64λ64, the maximum depth is equal to zero and the maximum transform size is equal to 32×32. In this case, the CB has to be partitioned at least once, since otherwise it would lead to a 64×64 TB, which is not allowed. The RQT parameters, i.e. maximum RQT depth, minimum and maximum transform size, are transmitted in the bitstream at the sequence parameter set level. Regarding the RQT depth, different values can be specified and signaled for intra and inter coded CUs.

The quadtree transform is applied for both Intra and Inter residual blocks. Typically, the DCT-II transform of the same size of the current residual quadtree partition is applied for a residual block. However, if the current residual quadtree block is 4×4 and is generated by Intra prediction, the above 4×4 DST-VII transform is applied.

In HEVC, larger size transforms, e.g., 64×64 transform are not adopted mainly due to its limited benefit considering and relatively high complexity for relatively smaller resolution videos.

Figure 4:
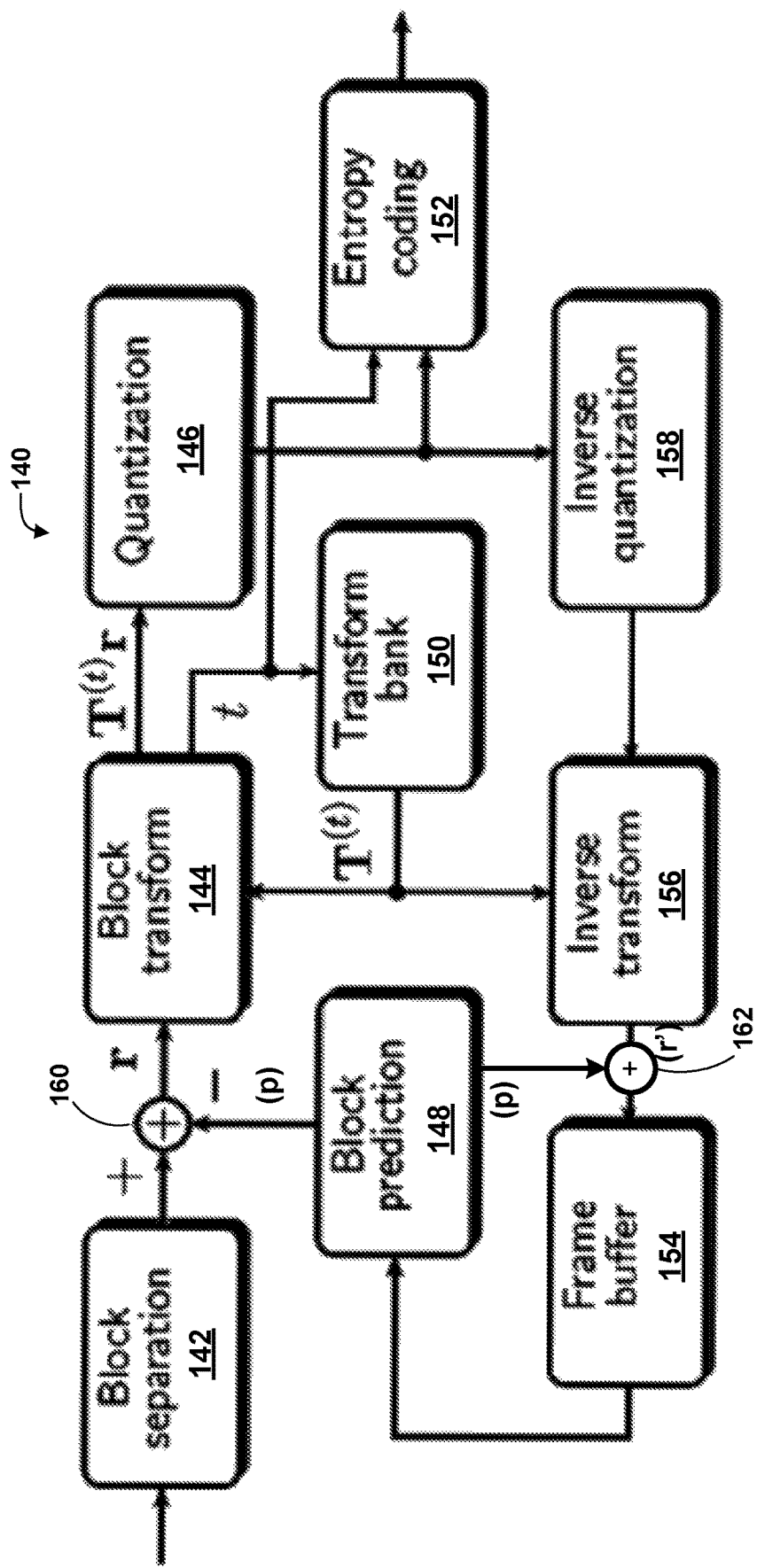
FIG. 4 is a block diagram illustrating an example system for hybrid video encoding with adaptive transform selection.

FIG. 4 is a block diagram illustrating an example system 140 for hybrid video encoding with adaptive transform selection. The example techniques described in this disclosure are applicable to a typical adaptive transform coding scheme shown FIG. 4, where for each block of prediction residuals, different transforms can be chosen by the encoder, and the choice of transform is encoded as side information for signaling.

In this example, system 140 includes block separation unit 142, block transform unit 144, quantization unit 146, block prediction unit 148, transform bank 150, entropy coding unit 152, frame buffer 154, inverse transform unit 156, inverse quantization unit 158, residual generation unit 160, and block reproduction unit 162.

In general, block separation unit 142 produces blocks from a picture (i.e., a frame) of video data. Block prediction unit 148 generates a prediction block (p) for a current block, and residual generation unit 160 generates a residual block (r) from the current (uncoded) block and the prediction block (p). Frame buffer 154 (also referred to as a decoded picture buffer (DPB)) stores decoded data of the current picture and previously decoded frames, if any. Block prediction unit 148 may generate the prediction block from previously decoded data of one or more pictures stored in frame buffer 154.

Block transform unit 144 applies one or more transforms ($T^{(t)}$) to the residual block, including residual data in the spatial domain, to generate a transform block ($T^{(t)}r$) that represents the residual data in the frequency domain. The transform ($T^{(t)}$) may be, for example, a discrete cosine transform (DCT), a discrete sine transform (DST), horizontal and/or vertical transforms, Karhunen-Loeve transforms (KLTs), or any other such transform. Block transform unit 144 provides the transform block ($T^{(t)}r$) to quantization unit 146, and an indication of the transform (t) to transform bank 150 and entropy coding unit 152. Transform bank 150 provides one or more transform matrices to block transform unit 144 and inverse transform unit 156.

In accordance with the techniques of this disclosure, block transform unit 144 may partition a residual block of a current block according to a partitioning tree type, such as one of: quadtree partitioning, binary tree partitioning, ternary tree partitioning, or four-TU partitioning, as discussed below, into a plurality of residual sub-blocks, and block transform unit may provide an indication of the partitioning of the residual block to entropy coding unit 152.

Quantization unit 146 quantizes transform coefficients of the transform block and provides the quantized transform block to entropy coding unit 152 and inverse quantization unit 158. Entropy coding unit 152 encodes syntax elements representing, for example, the transform indication (t), the quantized transform coefficients, prediction information (e.g., a prediction mode and corresponding information, such as a location of reference data to be used in the prediction mode, e.g., motion information for inter-prediction).

Entropy coding unit 152 may use the techniques of this disclosure to entropy encode syntax elements representing, for a residual block, whether the residual block is partitioned and, if the residual block is partitioned, how the residual block is partitioned. Entropy coding unit 152 may encode, for a residual block, a flag that signals whether the residual block is partitioned. When the residual block is partitioned into a plurality of sub-blocks, entropy coding unit 152 may also encode an index value that that indicates the partitioning type for the residual block. For example, block transform unit 144 may be configured to construct a list that includes information for a set of tree types. The set of tree types includes one or more of quadtree partitioning and binary tree partitioning. The set of tree types may also include ternary tree partitioning and four-TU partitioning. The example of the different tree type is described in more detail below. Block transform unit 144 may determine an index value that identifies the partitioning type from the set of tree types, and entropy encoding unit 152 may encode the index value. Entropy coding unit 152 may also encode any other partitioning information for the residual block, such as whether the residual block is horizontally or vertically partitioned, whether the partition is symmetric or asymmetric, and the like.

Inverse quantization unit 158 may inverse quantize (i.e., dequantize) the quantized transform coefficients received from quantization unit 146. Inverse transform unit 156 may determine a partitioning of residual blocks based on the entropy coded syntax elements that indicate whether a partition block is partitioned and how it is partitioned, to determine the partitioning of residual block, and may apply an inverse transform scheme to the transform coefficients received from inverse quantization unit 158 to reproduce the residual block (r') for the current block. Block reproduction unit 162 further combines the prediction block (p) from block prediction unit 148 with the reproduced residual block (r') to form a decoded block, which is stored in frame buffer 154.

The techniques of this disclosure may be performed by system 140, or a corresponding decoding system. In general, the techniques of this disclosure are applicable to an adaptive transform coding scheme, where for each block of prediction residuals, different transforms can be selected by a video encoder 200, signaled as side information, and determined by a video decoder 300 using the side information. Side information is one example and should not be considered limiting.

Figure 5B:
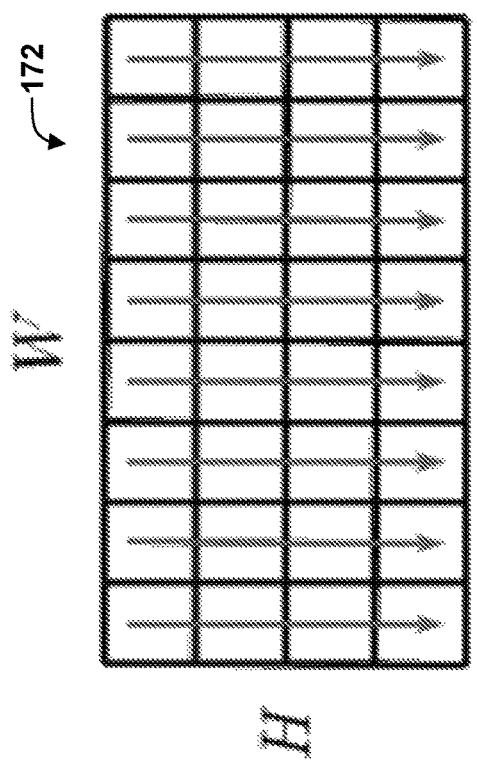
FIGS. 5A and 5B are conceptual diagrams illustrating horizontal and vertical transforms as a separate transform implementation.
Figure 5A:
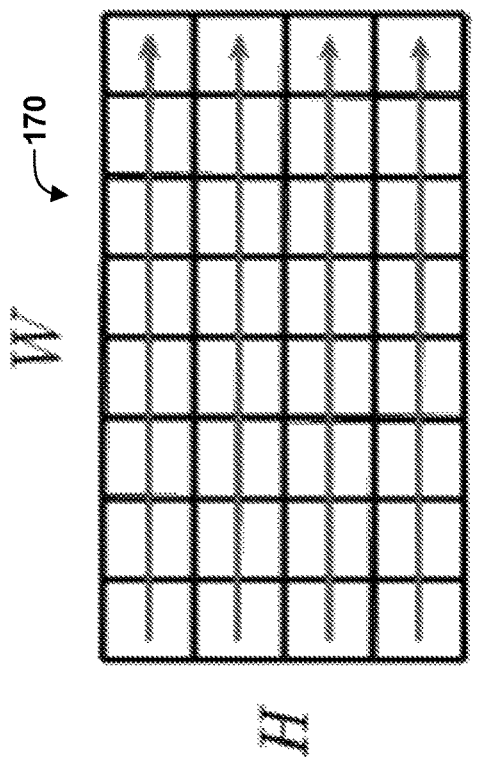

In practice, to reduce computational complexity the block transforms are commonly computed in a separable manner, i.e., the horizontal and vertical lines are transformed independently, as shown in FIGS. 5A and 5B. FIGS. 5A and 5B are conceptual diagrams illustrating horizontal and vertical transforms as a separate transform implementation. FIG. 5A represents a set of H horizontal transforms 170, while FIG. 5B represents a set of W vertical transforms 172. In particular, horizontal and vertical lines of residual values may be transformed independently using the horizontal transforms 170 and vertical transforms 172, respectively.

In video coding standards prior to HEVC, only a fixed separable transform is used, where DCT-2 is used both vertically and horizontally. In HEVC, in addition to DCT-2, DST-7 is also employed for 4×4 blocks as a fixed separable transform. U.S. Patent Publication No. 2016/0219290 and U.S. Patent Publication No. 2018/0020218 cover adaptive extensions of those fixed transforms, and an example of AMT in U.S. Patent Publication No. 2016/0219290 has been adopted in the Joint Experimental Model (JEM) of the Joint Video Experts Team (WET) X. Zhao, J. Chen, M. Karczewicz, L. Zhang, X. Li, and W.-J. Chien, "Enhanced multiple transform for video coding," *Proc. Data Compression Conference*, pp. 73-82, March 2016.

The AMT designs described in U.S. Patent Publication No. 2016/0219290 and U.S. Patent Publication No. 2018/0020218 offer 5 transform options for video encoder 200 to select on a per-block basis (this selection is generally done based on a rate-distortion metric). Then, the selected transform index is signaled to video decoder 300.

Figure 6:
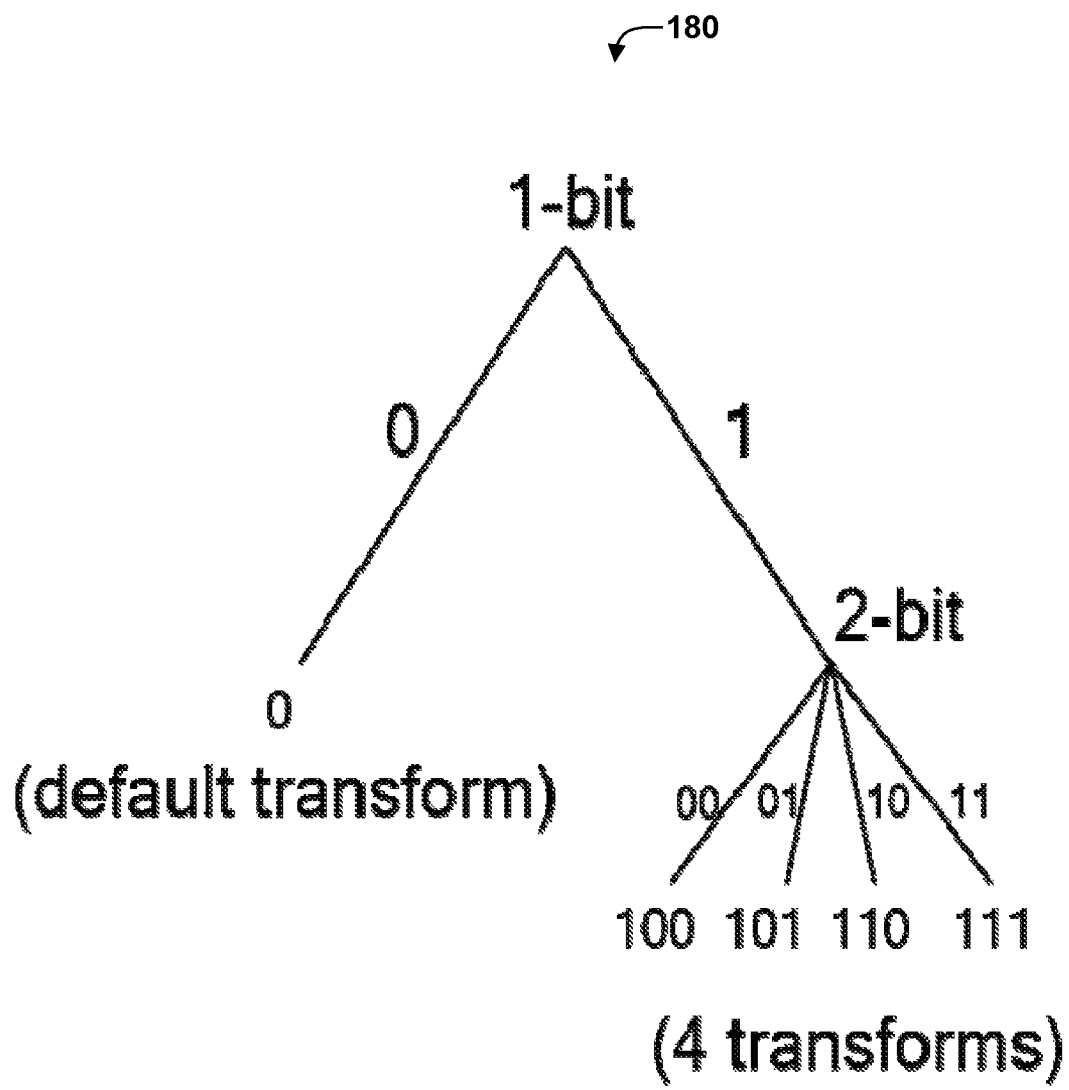
FIG. 6 is a conceptual diagram illustrating transform signaling.

FIG. 6 is a conceptual diagram illustrating transform signaling. For example, FIG. 6 illustrates the signaling proposed in U.S. Patent Publication No. 2016/0219290 and U.S. Patent Publication No. 2018/0020218 where 1-bit is used to signal the default transform and 2 additional bits (i.e., 3 bits in total) are used to signal 4 transforms. For example, one of five transforms (default transforms) is signaled using 0 (i.e., 1-bit) and the other four transforms are signaled using 3-bits (i.e., 100, 101, 110, and 111).

In U.S. Patent Publication No. 2016/0219290 and U.S. Patent Publication No. 2018/0020218, the default transform is selected as the separable 2-D DCT, which applies DCT-2 both vertically and horizontally. The rest of the AMTS are defined based on intra-mode information in U.S. Patent Publication No. 2016/0219290. U.S. Patent Publication No. 2018/0020218 proposes an extension of U.S. Patent Publication No. 2016/0219290 by defining the set of those 4 transforms based on both prediction mode and block size information.

In a version of VVC reference software, VTM 3.0, the signaling scheme illustrated in FIG. 6 is used. Specifically, for each coding unit (CU), a single bit (a flag) is used to determine whether (i) DCT2 is used in both horizontal and vertical direction or (ii) two additional bits (called AMT/MTS indexes) are used to specify the 1-D transforms applied horizontally or vertically. These 4 transforms are defined by assigning DST-7/DCT-8 to be applied on rows/columns of a given block. For example, MTS index=0 corresponds to the separable transform that applies DST-7 both horizontally and vertically, and MTS index=1 corresponds to applying DCT-8 horizontally and DST-7 vertically.

Currently in VVC (and reference software VTM-3.0), the transform scheme may not have a flexible partitioning method for transform units (TUs), where the transform block sizes are the same as coding unit (CU) sizes. In practice, better compression performance may be achieved using TU partitioning techniques such as RQT (described above), since partitioning allows transforms to capture the energy localized in different region via more flexible partitioning. This disclosure discloses various tree-based partition designs accommodating the AMT/MTS scheme currently adopted in VVC (VTM-3.0).

Figure 7:
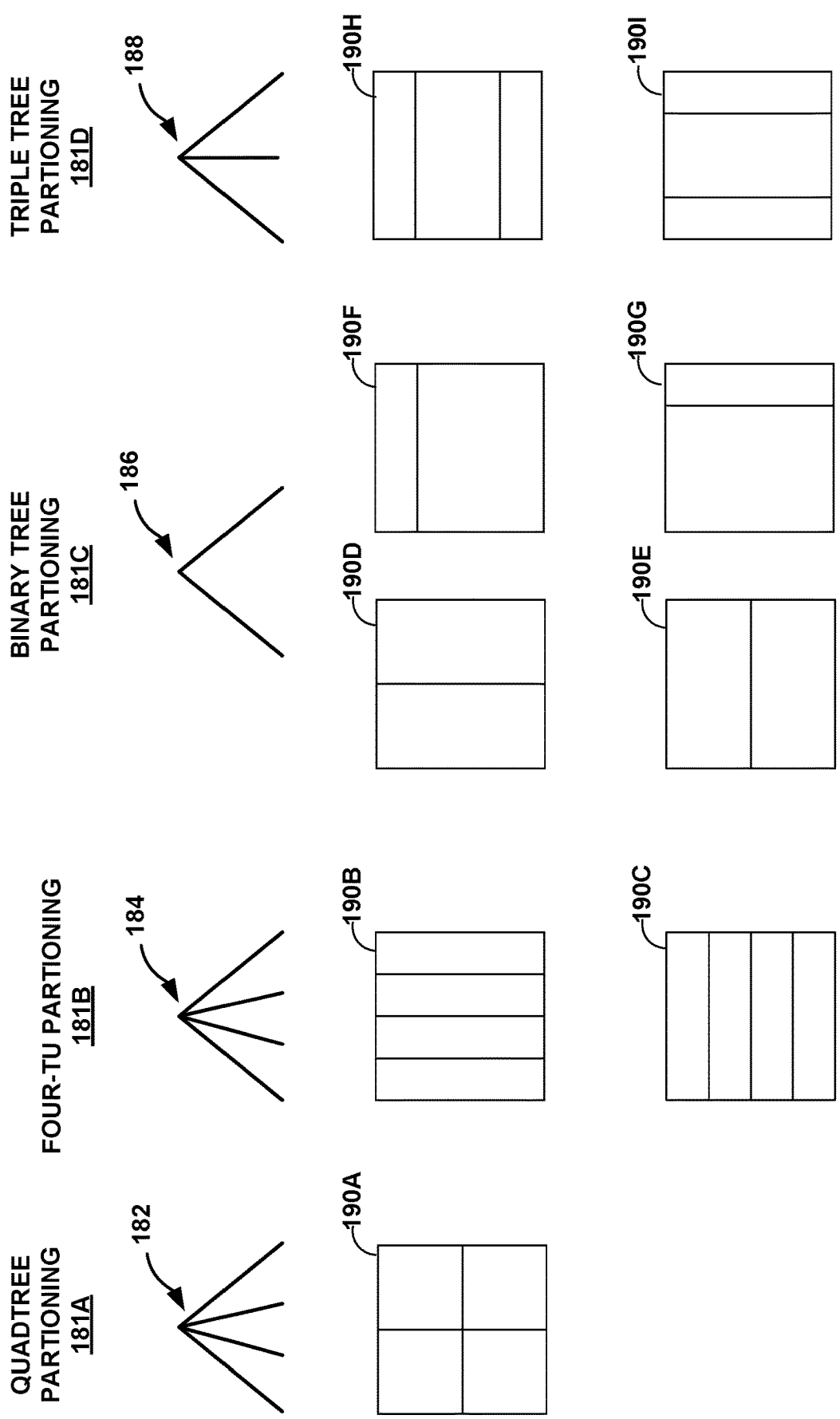
FIG. 7 is a conceptual diagram illustrating respective tree-based partitioning on a block.
Figure 8:
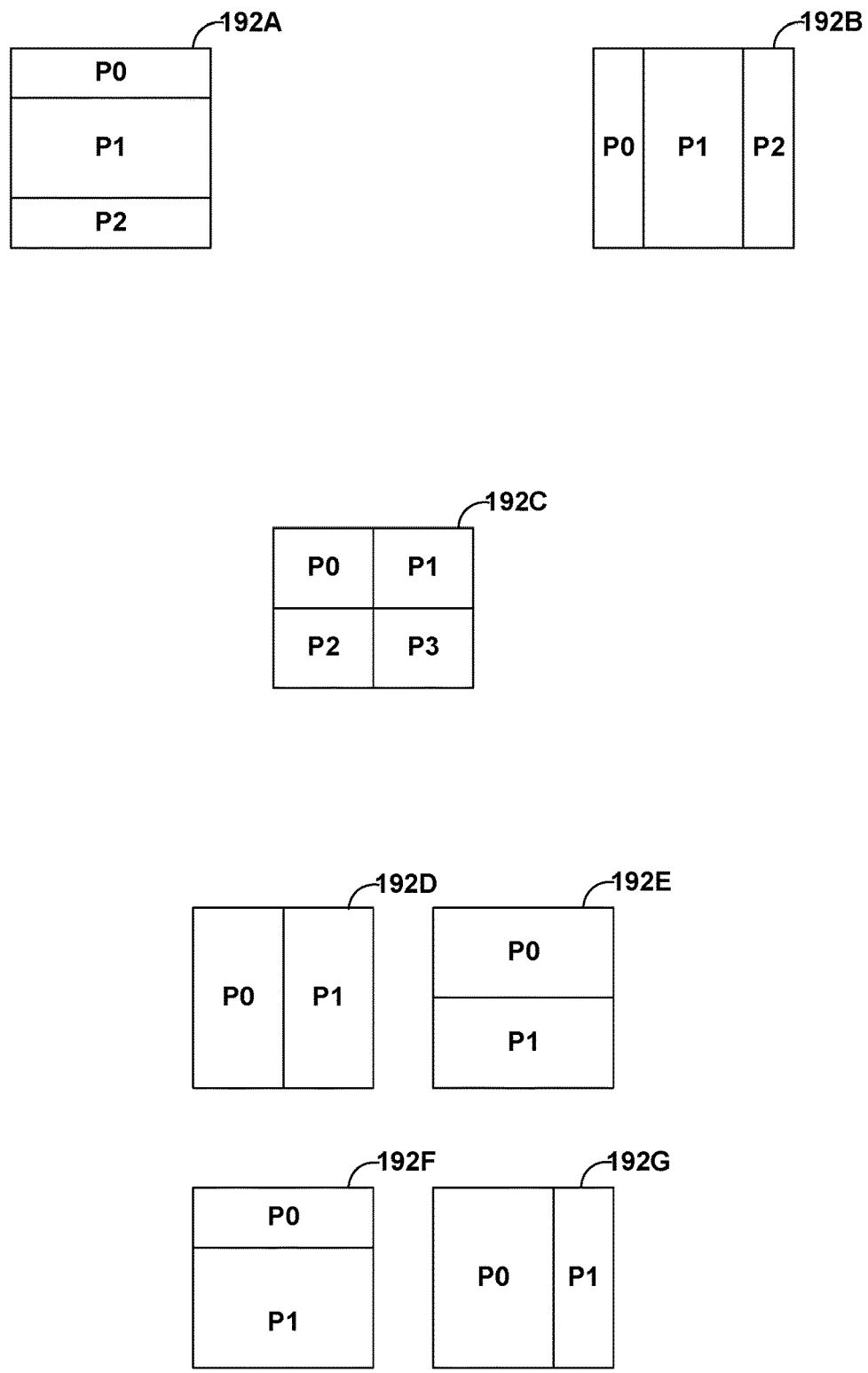
FIG. 8 is a conceptual diagram illustrating examples of quadtree-based partitioning, binary tree partitioning, and triple tree partitioning.

Aspects of the present disclosure describe a more flexible partitioning scheme for transform units (TUs) that enable greater compression performance to be achieved and describe how transforms may be selected for such partitions. The example techniques may be performed by video encoder 200 and/or video decoder 300. For ease, the examples are described with FIG. 7 and FIG. 8. For instance, FIG. 7 is a conceptual diagram illustrating respective tree-based partitioning on a block. Meanwhile, FIG. 8 is a conceptual diagram illustrating examples of quadtree-based partitioning, binary tree partitioning, and triple tree partitioning. As shown in FIG. 8, in triple-tree based partitioning, a transform unit (TU) such as block 192A or block 192B is partitioned into three sub-TUs (e.g., P0, P1, and P2). In quadtree partitioning, a TU such as block 192C is partitioned into four sub-TUs (e.g., P0, P1, P2, and P3) that are square. In binary tree partitioning, a TU such as block 192D, block 192E, block 192F, and or block 192D is partitioned into two sub-TUs (e.g., P0 and P1).

A TU may be partitioned in one level or in multiple levels (depths >0). Thus, a TU may be partitioned into a plurality of sub-TUs, and one or more of the plurality of sub-TUs can themselves be further partitioned, and so on. Alternatively, a TU may not be partitioned, and the block size for the TU can be the same as the block size for the CU (depth=0). Throughout this disclosure, the term "residual block" and "residual sub-blocks" are used. It should be understood that a TU is an example of a residual block and the plurality of sub-TUs are an example of a plurality of residual sub-blocks, and that the techniques discussed herein regarding a residual block are equally applicable to a TU. Similarly, the techniques discussed herein regarding a TU are also equally applicable to a residual block.

A TU at a certain level of partition may be partitioned based on a tree. Examples of trees and corresponding partitions include the examples illustrated in FIG. 7. For instance, quadtree partitioning 181A is partitioning of a block based on quadtree 182 where a square or non-square TU is partitioned into four sub-TUs by partitioning a TU both horizontally and vertically. For example, block 190A is partitioned according to quadtree partitioning 181A into four equal-sized square blocks. Four-TU partitioning 181B is partitioning of a block based on quadtree 184 where a square or non-square TU is partitioned into four sub-TUs by only horizontally partitioning the TU or by only vertically partitioning the TU. For example, block 190B is vertically partitioned according to four-TU partitioning into four vertical rectangular partitions and block 190C is horizontally partitioned according to four-TU partitioning into four horizontal rectangular partitions. As such, a residual block, such as a TU, may be partitioned according to at least one of: quadtree partitioning 181A, four-TU partitioning 181B.

Binary tree partitioning 181C is a partitioning of a block based on binary tree 186 where a square or non-square TU is partitioned into two sub-TUs, which are obtained by partitioning a TU either horizontally or vertically. Blocks 190D and 190G are each vertically partitioned according to binary tree partitioning 181C into two vertical rectangular partitions, while blocks 190E and 190F are each horizontally partitioned according to binary tree partitioning 181C into two horizontal rectangular partitions. Blocks 190D and 190E are symmetrically partitioned to result in blocks 190D and 190E each having two partitions of the same size. Meanwhile, blocks 190F and 190G are asymmetrically partitioned to result in blocks 190F and 190G each having two partitions of different sizes. As such, a residual block, such as a TU, may be partitioned according to binary tree partitioning 181C. Triple tree partitioning 181D (also referred to as ternary tree partitioning) is a partitioning of a block based on triple tree 188 (also known as ternary tree) where a square or non-square TU is partitioned into three sub-TUs, which are obtained by partitioning a TU either horizontally or vertically at two separate locations. For example, block 190H is horizontally partitioned according to triple tree partitioning into three horizontal rectangular partitions, while block 190I is vertically partitioned according to triple tree partitioning into three vertical rectangular partitions. As such, a residual block, such as a TU, may be partitioned according to triple tree partitioning 181D.

A TU partitioning can be applied to square or non-square TU blocks. FIG. 7 illustrate example partitioning of square blocks, but the techniques are applicable to non-square blocks as well, so that a rectangular and therefore non-square TU may equally be partitioned according to the partition trees described throughout this disclosure. For example, if a square TU is partitioned according to a binary tree into two rectangular TUs, one or both of the rectangular TUs may also be partitioned according to one of the partition trees. As such, a residual block, such as a TU, may be square or non-square, and both square and non-square residual blocks may equally be partitioned according to the techniques disclosed herein.

For signaling the partition information, a flag (e.g., a split flag) can be signaled in the bitstream to determine if there is a split in the TU. If the TU is partitioned (i.e., if the split flag is enabled), an additional partitioning/split information may be signaled for to specify the type of partitioning. Such additional index information may be the type of tree (e.g., quad-tree, binary tree, ternary tree, and/or four-TU split).

For example, video encoder 200 may determine that a residual block for a current block of video data is partitioned according to a partition tree type into a plurality of residual sub-blocks, and may encode a bitstream as an encoded representation of video data that signals information indicative of whether the residual block is partitioned and further signals information indicative of the partition tree type for the residual block that is partitioned. Similarly, video decoder may receive, in a bitstream that comprises an encoded representation of the video data, information indicative of whether a residual block is partitioned and information indicative of a partition tree type for the residual block based on the residual block being partitioned, wherein the residual block is indicative of a difference between a current block and a prediction block.

For a given/signaled tree type, a partition type may be further signaled. For example, for the triple-tree case (e.g., triple tree partitioning 181D) a single bit can be use to specify if a TU is horizontally split, such as in block 190H, or vertically split, such as in block 190I. For the binary-tree cases (e.g., binary tree partitioning 181C) the signaling may specify if a TU is horizontally split, such as in blocks 190E and 190F, or vertically split, such as in blocks 190D and 190G, as well as whether the TU is symmetrically split, such as in blocks 190D and 190E, or asymmetrically split, such as in blocks 190F and 190G.

For example, the bitstream that signals the information indicative of the partition tree type for the residual block may include index information into a set of tree types, and the set of tree types information may include one or more of a quadtree partitioning and a binary tree partitioning. Further, when the information indicative of the partition tree type for the residual block indicates the partition tree type is one of a binary tree partitioning, the bitstream may further signal information indicative of whether the residual block is horizontally split or vertically split.

In some examples, given a collection of sub-TUs obtained after partitioning the TUs, coded block flags (called cbfs in VVC) can be inferred and/or restricted depending on the prediction mode, partition tree type, partition type or any other side information that is encoded in the bitstream. For example, the sub-TU denoted as P1 in blocks 192A and 192B of FIG. 8 can be restricted to always have a disabled cbf flag (flag=0) so that no cbf signaling is required for P1. A similar scheme can be also used to infer or restrict transform skip flags for each sub-TUs.

In some examples, given a collection of sub-TUs obtained after partitioning, an AMT/MTS index may be signaled for each sub-TU to specify the separable transform applied for that sub-TU. In this way, multiple transforms may be applied to each sub-TU.

In some examples, a transform selection such as AMT/MTS indices and/or flag may still be signaled at TU level even TU is split into sub-TUs. In these examples, every sub-TU may use the signaled transform choice. In this case, overhead can be saved for each sub-TU, and the advantages of finer granular transform may still be utilized.

In some examples, given a collection of sub-TUs obtained after partitioning, transform kernels for the sub-TUs may be restricted or inferred in either horizontal direction, vertical direction or both directions. One example of restriction or inference is done based on prediction mode, partition tree type, partition type or any other side information. In this case, an AMT/MTS index (or transformation definition) may be restricted or inferred based on the prediction mode, partition tree type, partition type or any other side information.

In some examples, instead of restricting or inferring a certain transform basis, the context modeling may be applied based on the restriction/inference rules. In one example, a context is assigned for the cases, when a restriction rule is applied, in such case the transform selection is still possible (different when this transform selection is not possible due to restriction), but a context is assigned to signal such transform selection, as a result transform overhead maybe more efficiently coded and all transform selections are available. The assigned context maybe a different separate context from the already existed context in transform selection signaling.

In the following examples of the restriction, the same rules can be used for context assignment in transform selection overhead signaling. Examples of such designs include the following.

Given a quad-tree partitioned TU (as illustrated in FIG. 7 as block 190A and FIG. 8 as block 192C), the transformation of sub-TU P0 may be restricted such that DCT-8 is used both vertically and horizontally, the transformation of sub-TU P1 may be restricted such that DST-7 is applied horizontally and DST-8 is used both vertically, the transformation of sub-TU P2 may be restricted such that DCT-8 is applied horizontally and DST-7 is used both vertically, the transformation of sub-TU P3 may be restricted such that DST-7 is used both vertically and horizontally.

Given a quad-tree partitioned TU (as illustrated in FIG. 7 as block 190A and FIG. 8 as block 192C), all sub-TUs (P0, P1, P2 and P3) may be restricted such that DST-7 is used both vertically and horizontally. In another example, DCT-2 can be used instead of DST-7 or DCT-8.

Given a binary tree partitioned TU (as illustrated in FIG. 7 as blocks 190D-190G and in FIG. 8 as blocks 192D-192G), the transformation of sub-TUs may be inferred/restricted as follows. For horizontal splits such as blocks 190E and 190F in FIG. 7 and blocks 192E and 192F in FIG. 8, DCT-2 may be used horizontally and DCT-8 may be used vertically to transform sub-TU P0, and DCT-2 may be used horizontally and DST-7 may be used vertically to transform sub-TU P1. For vertical splits such as illustrated in FIG. 7 as blocks 190D and 190G and in FIG. 8 as blocks 192D and 192G, DCT-8 may be used horizontally and DCT-2 may be used vertically to transform sub-TU P0, and DST-7 may be used horizontally and DCT-2 may be used vertically to transform sub-TU P1. Instead of DCT-2, DST-7 or DCT-8 may also be used as transforms for above two cases.

One or combinations of the above methods can be used for intra-predicted CUs only. One or combinations of the above methods can be used for inter-predicted CUs only. One or combinations of the above methods can be used for both intra and inter predicted CUs. One or combinations of the above methods can be used for luma or chroma channels or both. A TU partitioning and associated transform scheme may be defined based on one or combinations of the above methods.

Figure 9:
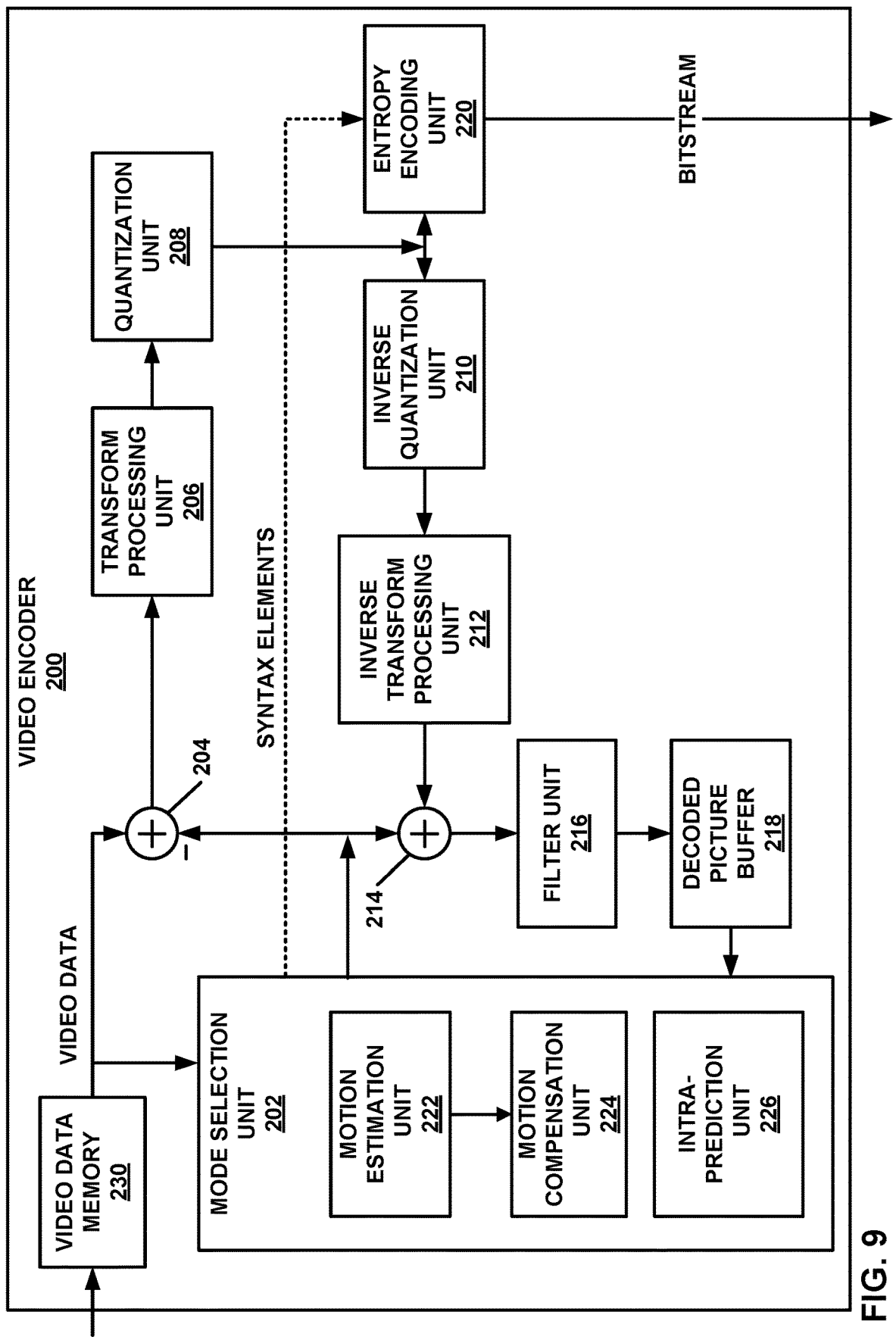
FIG. 9 is a block diagram illustrating an example video encoder that may perform the techniques of this disclosure.

FIG. 9 is a block diagram illustrating an example video encoder 200 that may perform the techniques of this disclosure. FIG. 9 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards, and are applicable generally to video encoding and decoding.

In the example of FIG. 9, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, of FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 9 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like.

Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

In accordance with the techniques of this disclosure, as part of generating a residual block (i.e., a transform unit) for the current block, residual generation unit 204 may partition the residual block for the current block into a plurality of residual sub-blocks (i.e., transform units) according to a partition tree type. Residual generation unit 204 may perform such partitioning for square residual blocks as well as non-square residual blocks (e.g., rectangular residual blocks) to generate square as well as non-square residual sub-blocks, and residual generation unit 204 may also partition one or more of the residual sub-blocks.

As discussed above, a partition block may be partitioned into residual sub-blocks according to one or more of: a quadtree partitioning, a binary tree partitioning, a ternary tree partitioning, or a four-TU partitioning, such as shown in FIGS. 7 and 8. In some examples, a partition block may be partitioned into residual sub-blocks according to one or more of: a quadtree partitioning or a binary tree partitioning.

When residual generation unit 204 partitions a residual block according to a binary tree partitioning, a ternary tree partitioning, or a four-TU partitioning, residual generation unit 204 may horizontally split the residual block or vertically split the residual block. For example, blocks 190C, 190E, 190F, and 190H of FIG. 7 illustrate examples of horizontal split while blocks 190B, 190D, 190G, and 190I of FIG. 7 illustrates examples of vertical split.

When residual generation unit 204 partitions a residual block according to a binary tree partitioning or a ternary tree partitioning to horizontally split or vertically split the residual block, residual generation unit 204 may symmetrically split the residual block or may asymmetrically split the residual block. For example, blocks 190D and 190E of FIG. 7 illustrate examples of symmetrical split while blocks 190F and 190G of FIG. 7 illustrate examples of asymmetrical split.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

In some examples, transform processing unit 206 may apply multiple transforms of a multiple transform (MT) scheme to a residual block for a current block, including applying multiple transforms of a MT scheme to each of the plurality of residual sub-blocks resulting from the partitioning of a residual block. The MT scheme may define, for example, a primary transform and a secondary transform to be applied to the residual block. Additionally or alternatively, the MT scheme may define a horizontal transform and a vertical transform, such as those shown in FIGS. 5A and 5B as discussed above. In any case, transform processing unit 206 may apply each transform of the MT scheme to the residual block to generate transform coefficients of a transform coefficient block.

For example, transform processing unit 206 may select a transform for each of the plurality of residual sub-blocks, where the selection of the transform for a respective residual block of the plurality of residual sub-blocks is a multiple transform selection (MTS) index for the respective residual block. In this way, a multiple transform can be selected for each residual sub-block.

In another example, transform processing unit 206 may select a transform for a residual block that is applied to each of the plurality of residual sub-blocks resulting from the partitioning of the residual block. For example, a multiple transform can be selected for a residual block that is applied to each residual sub-block resulting from the partitioning of the residual block. In the example of block 192C in FIG. 8, the selected multiple transform for block 192C may be applied to each of the residual sub-blocks P0, P1, P2, and P3.

In accordance with techniques of the present disclosure, transform processing unit 206 may determine a coded block flag (cbf) and/or a transform skip flag for each of the plurality of residual sub-blocks. A coded block flag may signal information regarding whether at least one non-zero coefficient transform level is transmitted for the residual sub-block. A transform skip flag may signal information regarding whether transform is skipped for the residual sub-block.

In accordance with techniques of the present disclosure, transform processing unit 206 may determine transform kernels for the plurality of residual sub-blocks resulting from partitioning a residual block based at least in part on one of: a partition tree type for the residual block or a partitioning type for the residual block.

In accordance with techniques of the present disclosure, transform processing unit 206 may determine context assignments for the plurality of residual sub-blocks based at least in part on one of: a partition tree type for the residual block or a partitioning type for the residual block. In some examples, transform processing unit 206 may determine the context assignments for the plurality of residual sub-blocks for luma components of the current block and/or chroma components of the current block.

In one example, when transform processing unit 206 determines that the residual block is partitioned according to a quadtree partitioning into four residual sub-blocks, transform processing unit 206 may determine that DCT-8 is used as both a horizontal transform and a vertical transform for a first residual sub-block of the plurality of residual sub-blocks, that DST-7 is used in the horizontal transform and DST-8 is used as the vertical transform for a second residual sub-block of the plurality of residual sub-blocks, that DCT-8 is used in the horizontal transform and DST-7 is used as the vertical transform for a third residual sub-block of the plurality of residual sub-blocks, and that DST-7 is used as both the horizontal transform and the vertical transform for a fourth residual sub-block of the plurality of residual sub-blocks.

In another example, when transform processing unit 206 determines that the residual block is partitioned according to a quadtree partitioning into four residual sub-blocks, transform processing unit 206 may determine that DST-7 is used as both a horizontal transform and a vertical transform for each of the plurality of residual sub-blocks.

In another example, when transform processing unit 206 determines that the residual block is partitioned according to a quadtree partitioning into four residual sub-blocks, transform processing unit 206 may determine that DCT-2 is used as at least one of: a horizontal transform or a vertical transform for one or more of the plurality of residual sub-blocks. Thus, for example, DCT-2 may be used as the horizontal transform and DST-7 or DCT-8 may be used as the vertical transform for one or more of the plurality of residual sub-blocks, and DCT-2 may be used as the vertical transform and DST-7 or DCT-8 may be used as the horizontal transform for one or more of the plurality of residual sub-blocks.

In another example, when transform processing unit 206 determines that the residual block is partitioned according to a binary tree partitioning into two residual sub-blocks, and that the partition type for the residual block is a horizontal split, transform processing unit 206 may determine that DCT-2 is used as a horizontal transform and DCT-8 is used as a vertical transform for a first residual sub-block of the plurality of residual sub-blocks, and that DCT-2 is used as the horizontal transform and DST-7 is used as the vertical transform for a second residual sub-block of the plurality of residual sub-blocks.

In another example, when transform processing unit 206 determines that the residual block is partitioned according to a binary tree partitioning into two residual sub-blocks, and that the partition type for the residual block is a vertical split, transform processing unit 206 may determine that DCT-8 is used as a horizontal transform and DCT-2 is used as a vertical transform for a first residual sub-block of the plurality of residual sub-blocks, and that DST-7 is used as the horizontal transform and DCT-2 is used as the vertical transform for a second residual sub-block of the plurality of residual sub-blocks.

In another example, when transform processing unit 206 determines that the residual block is partitioned according to a binary tree partitioning into two residual sub-blocks, transform processing unit 206 may determine that one of: DST-7 or DCT-8 is used as at least one of: a horizontal transform or as a vertical transform for one or more of the plurality of residual sub-blocks. The use of DST-7 or DCT-8 may be in place of DCT-2 in the examples of binary tree partitioning described above.

In some examples, inverse transform processing unit 206 may determine context assignments for a residual block based at least in part on the size of the residual block. For example, when the residual block has a small size, such as less than or equal to 16 samples (e.g., a 4×4 block that has a size of 16 samples), and when the residual block is partitioned according to a binary tree partitioning, inverse transform processing unit 206 may determine the context assignments for the plurality of residual sub-blocks so that DST-7 is used as both the horizontal transform and the vertical transform for each of the plurality of residual sub-blocks.

In another example, when the residual block has a large size, such as larger than or equal to 16 samples (e.g., a 4×8 block that has a size of 32 samples), and when the residual block is partitioned according to a binary tree partitioning, transform processing unit 206 may determine the context assignments for the plurality of residual sub-blocks so that DCT-2 is used as a horizontal transform and DST-7 is used as a vertical transform for a first residual sub-block of the plurality of residual sub-blocks, and that DCT-2 is used as the vertical transform and DST-7 is used as the horizontal transform for a second residual sub-block of the plurality of residual sub-blocks.

In another example, when the residual block has a horizontal size or a vertical size that is less than or equal to 2 samples (e.g., a 2×8 block), transform processing unit 206 may determine that no transform is to be applied to the plurality of residual sub-blocks.

In some examples, transform processing unit 206 may determine the context assignments for the plurality of residual sub-blocks base on the current block being an intra-predicted block. In some examples, transform processing unit 206 may determine the context assignments for the plurality of residual sub-blocks base on the current block being an inter-predicted block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

In accordance with the techniques of this disclosure, entropy encoding unit 220 may, for a residual block, entropy encode partitioning information associated with the residual block. Such partitioning information associated with the residual block may indicate whether the residual block is partitioned. If the residual block is partitioned, the entropy encoded partitioning information may further indicate the partition tree type for the residual block. The partition tree type may be one of: a quadtree partitioning, a binary tree partitioning, a ternary tree partitioning, or a four-TU partitioning. To indicate the partition tree type, the entropy encoded partitioning information may include an index into a list of possible partitioning types. If the partition tree type is one of: the binary tree partitioning, the ternary tree partitioning, or the four-TU partitioning, the entropy encoded partitioning information may further signal information indicative of a partitioning type for the residual block that indicates whether the residual block is horizontally split or vertically split. Further, if the partition tree type for the residual block is the binary tree partitioning or the ternary tree partitioning, the entropy encoded information may further signal information indicative of whether the TU is symmetrically split or asymmetrically split.

Entropy encoding unit 220 may also, for a residual block, entropy encode other information associated with the residual block. For example, entropy encoding unit 220 may encode an indication of the transform that is selected for each of the plurality of residual sub-blocks resulting from the partitioning of the residual block, such as an MTS index for each of the respective residual subblocks. In another example, entropy encoding unit 220 may encode an indication of a transform that is selected for the residual block, where the selected transform is applied to each of the plurality of residual sub-blocks resulting from the partitioning of the residual block.

In accordance with some aspects of this disclosure, entropy encoding unit 220 may refrain from encoding information associated with context assignments for the plurality of residual sub-blocks resulting from partitioning of a residual block or transform kernels for the plurality of residual sub-blocks. Instead, video decoder 300 may infer such information regarding the residual block based on other information associated with the residual block that is encoded by entropy encoding unit 220, such as whether the residual block is partitioned, the partition tree type according to which the residual block was partitioned, the partition type of the residual block, as well as other side information entropy encoded by entropy encoding unit 220.

Video encoder 200 may output a bitstream that includes the entropy encoded syntax elements needed to reconstruct blocks of a slice or picture. In particular, entropy encoding unit 220 may output the bitstream including, for example, the entropy encoded partitioning information associated with the residual block, according to the techniques of this disclosure. As such, once encoder 200 has determined that a residual block for a current block of video data is partitioned according to a partition tree type into a plurality of residual sub-blocks, entropy encoding unit 220 may encode a bitstream as an encoded representation of video data that signals information indicative of whether the residual block is partitioned and further signals information indicative of the partition tree type for the residual block that is partitioned.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to determine that a residual block for a current block of video data is partitioned according to a partition tree type into a plurality of residual sub-blocks and encode a bitstream as an encoded representation of video data that signals information indicative of whether the residual block being partitioned and further signals information indicative of the partition tree type for the residual block.

Figure 10:
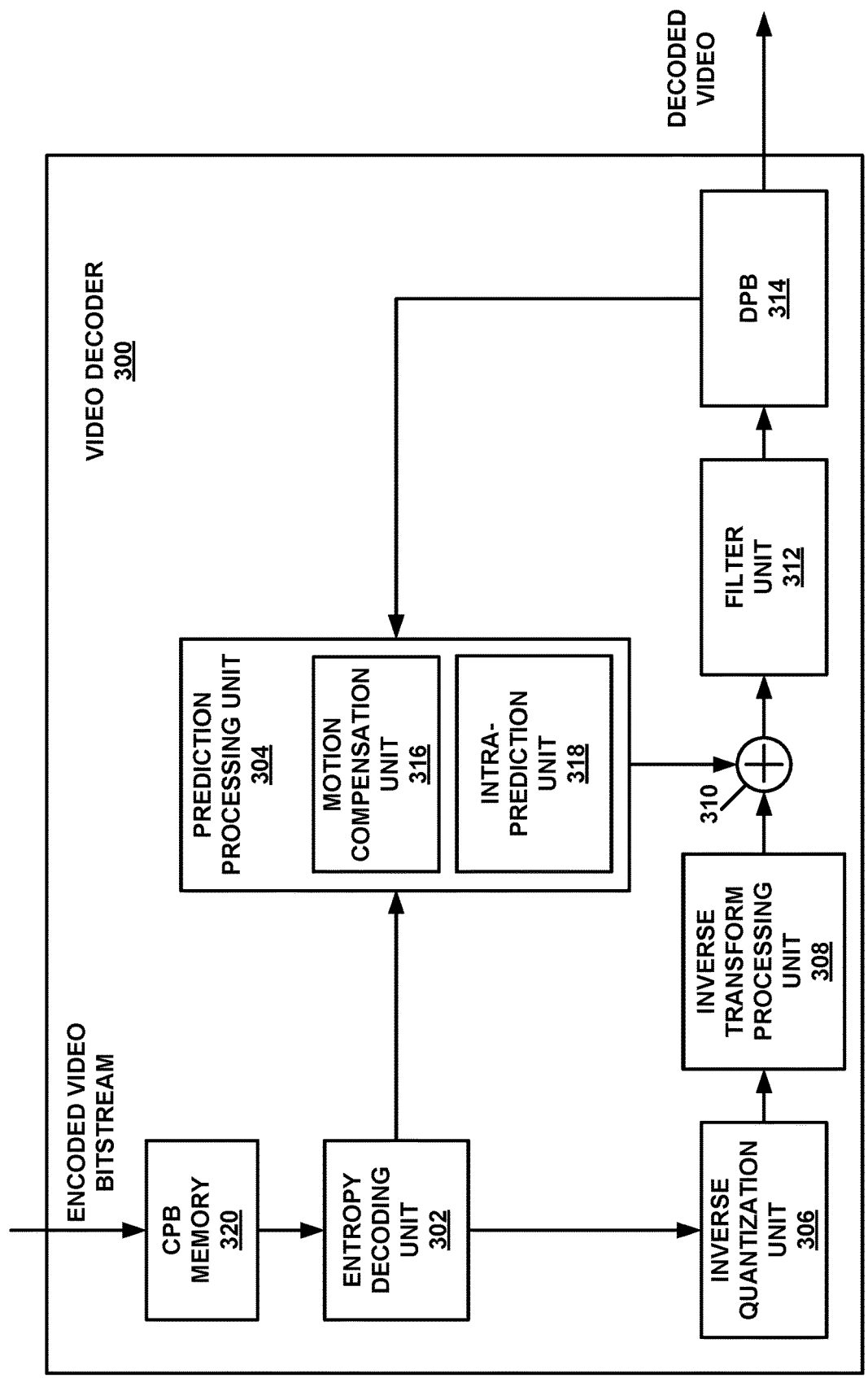
FIG. 10 is a block diagram illustrating an example video decoder that may perform the techniques of this disclosure.

FIG. 10 is a block diagram illustrating an example video decoder 300 that may perform the techniques of this disclosure. FIG. 10 is provided for purposes of explanation and is not limiting on the techniques as broadly exemplified and described in this disclosure. For purposes of explanation, this disclosure describes video decoder 300 according to the techniques of JEM, VVC, and HEVC. However, the techniques of this disclosure may be performed by video coding devices that are configured to other video coding standards.

In the example of FIG. 10, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, of FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300. As such, CPB memory 320, along with other components of video decoder 300 of FIG. 10, represent examples of means for receiving a bitstream.

The various units shown in FIG. 10 are illustrated to assist with understanding the operations performed by video decoder 300. The units may be implemented as fixed-function circuits, programmable circuits, or a combination thereof. Similar to FIG. 9, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s).

In accordance with the techniques of this disclosure, video decoder 300 may receive, in a bitstream that comprises an encoded representation of the video data, information indicative of whether a residual block is partitioned and information indicative of a partition tree type for the residual block based on the residual block being partitioned, wherein the residual block is indicative of a difference between a current block and a prediction block. The information indicative of whether a residual block is partitioned and the information indicative of a partition tree type for the residual block may be syntax elements that signal whether the residual block is partitioned and, if so, the partition tree type for the residual block.

In some examples, the information indicative of the partition tree type for the residual block may be index information into a set of tree types, and entropy decoding unit 302 may determine the partition tree type based on the received index information. For example, the set of tree types information may include one or more of a quad tree partitioning and a binary tree partitioning, In some examples, the bitstream received by video decoder 300 may further include information indicative of whether the residual block is horizontally split or vertically split, and/or whether the residual block is symmetrically split or asymmetrically split.

For example, the bitstream may include, for a residual block, a flag signaling whether the residual block is partitioned. If the flag is enabled, the bitstream may include an index into a list of partition tree types to indicate the partition tree type for partitioning the residual block, such as via multiple bits to index into a list of the following partition tree types: quadtree partitioning, binary tree partitioning, ternary tree partitioning, and four-TU partitioning. The bitstream may then also include, if necessary, flags signaling whether the residual block is horizontally split or vertically split, and whether the residual block is symmetrically split or asymmetrically split.

Entropy decoding unit 302 may entropy decode the partitioning information associated with a residual block for a current block of data being decoded from the bitstream. In particular, entropy decoding unit 302 may decode the partitioning information to determine whether the residual block is partitioned. If the partitioning information for the residual data in the bitstream signals that the residual block is partitioned, entropy decoding unit 302 may further decode the partitioning information to determine the partition tree type for the residual block. Depending on the partition tree type for the residual block, entropy decoding unit 302 may decode the partitioning information for the residual block in the bitstream to determine whether the residual block is horizontally split or vertically split, as well as whether the residual block is symmetrically split or asymmetrically split. As such, entropy decoding unit 302, along with other components of video decoder 300 of FIG. 10, represent examples of means for determining that the residual block is partitioned according to the partition tree type into a plurality of residual sub-blocks.

In addition, in some examples, entropy decoding unit 302 may also, for a residual block for a current block of data, entropy decode other information associated with the residual block. For example, entropy decoding unit 302 may decode an indication of the transform that is selected for each of the plurality of residual sub-blocks resulting from the partitioning of the residual block, such as an MTS index for each of the respective residual subblocks.

In another example, entropy decoding unit 302 may decode an indication of a transform that is selected for the residual block, where the selected transform is applied to each of the plurality of residual sub-blocks resulting from the partitioning of the residual block. Such a transform that is selected for the residual block may be signaled in the bitstream at the residual block-level, thereby saving overhead from having to indicate separate transforms for each of the residual sub-blocks while preserving the ability of partitioning a residual block into a plurality of residual sub-blocks.

In accordance with techniques of the present disclosure, entropy decoding unit 302 may infer or restrict a coded block flag (cbf) and/or a transform skip flag for each of the plurality of residual sub-blocks based on information such as the prediction mode for the current block, the partition tree type for the residual block, the partition type for the residual block, or any other side information included in the bitstream. A coded block flag may signal information regarding whether at least one non-zero coefficient transform level is transmitted for the residual sub-block. A transform skip flag may signal information regarding whether transform is skipped for the residual sub-block. For example, entropy decoding unit 302 may restrict a residual sub-block to always have a disabled coded block flag (flag=0) so that no cbf signaling is required for the residual sub-block.

Entropy decoding unit 302 may provide such information associated with the residual block to inverse transform processing unit 308. Thus, after inverse quantization unit 306 forms the transform coefficient block, inverse transform processing unit 308 may use such information associated with the residual block along with one or more transform coefficient blocks provided by inverse quantization unit 306 to generate a residual block associated with the current block.

Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block. As such, inverse transform processing unit 308, along with other components of video decoder 300 of FIG. 10, represent examples of means for producing residual data for the current block based at least in part on the residual block being partitioned according to the partition tree type into the plurality of residual sub-blocks.

In accordance with the techniques of this disclosure, inverse transform processing unit 308 may receive the partitioning information associated with a residual block for a current block of data from entropy decoding unit 302 and may determine a partitioning of the residual block into a plurality of residual sub-blocks. As discussed above, entropy decoding unit 302 may decode partitioning information for the residual block of the current block that indicates whether the residual block is partitioned, whether the residual block is horizontally split or vertically split, and whether the residual block is symmetrically split or asymmetrically split. Inverse processing unit 308 may use such information to determine the plurality of residual sub-blocks resulting from the partitioning of the residual block for the current block data.

Inverse transform processing unit 308 may apply one or more inverse transforms to one or more transform coefficient blocks based at least in part on the partitioning information to generate the residual block for the current block of video data, including generating the plurality of residual sub-blocks resulting from the partitioning of the residual block for the current block data. In this way, inverse transform processing unit 308 produces residual data for the current block of video data.

In some examples, inverse transform processing unit 308 may apply one or more inverse transforms indicated by the information decoded from the bitstream by entropy decoding unit 302. For example, if the bitstream includes information that indicates a transform that is selected for each of the plurality of residual sub-blocks resulting from the partitioning of the residual block, such as a MTS index for each of the respective residual sub-blocks, then inverse transform processing unit 308 may apply the selected transforms to the plurality of residual sub-blocks. In another example, if the bitstream includes information that indicates a transform that is selected for the residual block, then inverse transform processing unit 308 may apply the selected transform to each of the plurality of residual sub-blocks in the residual block.

In some examples, inverse transform processing unit 308 may infer or restrict transform kernels for the plurality of residual sub-blocks in at least one of: a horizontal direction or a vertical direction based at least in part on the partitioning information for the residual block that is included in the bitstream and/or other side information. Inferring or restricting the transform kernels for the plurality of residual sub-blocks includes inferring or restricting the MTS index or transformation definition for the plurality of residual sub-blocks based at least in part on the partitioning information for the residual block that is included in the bitstream and/or other side information.

Inferring or restricting the transform kernels means that the transform kernels are not explicitly signaled in the bitstream. Instead, the transform kernels may be inferred or restricted based at least in part on other information in the bitstream. In one example, the transform kernels may be inferred or restricted based on the partition tree type of the residual block signaled by the bitstream, such as based on whether the residual block is partitioned according to a binary tree partitioning, a four-TU partitioning, or a ternary tree partitioning, based on the partition type of the residual block, such as based on whether the residual tree is horizontally split or vertically split, and/or based on any other side information signaled in the bitstream. Inverse transform processing unit 308 may apply one or more inverse transforms to one or more transform coefficient blocks based at least in part on the inferred or restricted transform kernels for the plurality of residual sub-blocks to generate the residual block for the current block of video data.

In some examples, inverse transform processing unit 308 may infer or restrict context assignments for the plurality of residual sub-blocks based at least in part on the partitioning information for the residual block that is included in the bitstream and/or other side information, and inverse transform processing unit 308 may apply one or more inverse transforms to one or more transform coefficient blocks based at least in part on the inferred or restricted context assignments for the plurality of residual sub-blocks to generate the residual block for the current block of video data.

When context assignments are inferred or restricted, transform selection for the plurality of residual sub-blocks may still be possible, with contexts being assigned to signal such transform selections. The assigned context maybe a different separate context from the already existed context in transform selection signaling. As a result, transform overhead may be more efficiently coded and all transform selections may be available.

Inferring or restricting the context assignments for the plurality of residual sub-blocks means that the context assignments are not explicitly signaled in the bitstream. Instead, the context assignments may be inferred or restricted based at least in part on other information in the bitstream. In one example, the context assignments may be inferred or restricted based on the partition tree type of the residual block signaled by the bitstream, such as based on whether the residual block is partitioned according to a quadtree partitioning, a binary tree partitioning, a four-TU partitioning, or a ternary tree partitioning, based on the partition type of the residual block, such as based on whether the residual tree is horizontally split or vertically split, and/or based on any other side information signaled in the bitstream. In some examples, inverse transform processing unit 308 may infer or restrict the context assignments for the plurality of residual sub-blocks for luma components of the current block and/or chroma components of the current block.

In one example, when inverse transform processing unit 308 determines that the residual block is partitioned according to a quadtree partitioning into four residual sub-blocks, inverse transform processing unit 308 may infer or restrict the context assignments for the plurality of residual sub-blocks so that DCT-8 is used as both a horizontal transform and a vertical transform for a first residual sub-block of the plurality of residual sub-blocks, that DST-7 is used in the horizontal transform and DST-8 is used as the vertical transform for a second residual sub-block of the plurality of residual sub-blocks, that DCT-8 is used in the horizontal transform and DST-7 is used as the vertical transform for a third residual sub-block of the plurality of residual sub-blocks, and that DST-7 is used as both the horizontal transform and the vertical transform for a fourth residual sub-block of the plurality of residual sub-blocks.

In another example, when inverse transform processing unit 308 determines that the residual block is partitioned according to a quadtree partitioning into four residual sub-blocks, inverse transform processing unit 308 may infer or restrict the context assignments for the plurality of residual sub-blocks so that DST-7 is used as both a horizontal transform and a vertical transform for each of the plurality of residual sub-blocks.

In another example, when inverse transform processing unit 308 determines that the residual block is partitioned according to a quadtree partitioning into four residual sub-blocks, inverse transform processing unit 308 may infer or restrict the context assignments for the plurality of residual sub-blocks so that DCT-2 is used as at least one of: a horizontal transform or a vertical transform for one or more of the plurality of residual sub-blocks. Thus, for example, DCT-2 may be inferred or restricted as the horizontal transform and DST-7 or DCT-8 may be inferred or restricted as the vertical transform for one or more of the plurality of residual sub-blocks, and DCT-2 may be inferred or restricted as the vertical transform and DST-7 or DCT-8 may be inferred or restricted as the horizontal transform for one or more of the plurality of residual sub-blocks.

In another example, when inverse transform processing unit 308 determines that the residual block is partitioned according to a binary tree partitioning into two residual sub-blocks, and that the partition type for the residual block is a horizontal split, inverse transform processing unit 308 may infer or restrict the context assignments for the plurality of residual sub-blocks so that DCT-2 is used as a horizontal transform and DCT-8 is used as a vertical transform for a first residual sub-block of the plurality of residual sub-blocks, and that DCT-2 is used as the horizontal transform and DST-7 is used as the vertical transform for a second residual sub-block of the plurality of residual sub-blocks.

In another example, when inverse transform processing unit 308 determines that the residual block is partitioned according to a binary tree partitioning into two residual sub-blocks, and that the partition type for the residual block is a vertical split, transform inverse transform processing unit 308 may infer or restrict the context assignments for the plurality of residual sub-blocks so that DCT-8 is used as a horizontal transform and DCT-2 is used as a vertical transform for a first residual sub-block of the plurality of residual sub-blocks, and that DST-7 is used as the horizontal transform and DCT-2 is used as the vertical transform for a second residual sub-block of the plurality of residual sub-blocks.

In another example, when inverse transform processing unit 308 determines that the residual block is partitioned according to a binary tree partitioning into two residual sub-blocks, inverse transform processing unit 308 may infer or restrict the context assignments for the plurality of partition sub-blocks so that one of: DST-7 or DCT-8 is used as at least one of: a horizontal transform or as a vertical transform for one or more of the plurality of residual sub-blocks. The use of DST-7 or DCT-8 may be in place of DCT-2 in the examples of binary tree partitioning described above.

In some examples, inverse transform processing unit 308 may infer or restrict context assignments for a residual block based at least in part on the size of the residual block. For example, when the residual block has a small size, such as less than or equal to 16 samples (e.g., a 4×4 block that has a size of 16 samples), and when the residual block is partitioned according to a binary tree partitioning, inverse transform processing unit 308 may infer or restrict the context assignments for the plurality of residual sub-blocks so that DST-7 is used as both the horizontal transform and the vertical transform for each of the plurality of residual sub-blocks.

In another example, when the residual block has a large size, such as larger than or equal to 16 samples (e.g., a 4×8 block that has a size of 32 samples), and when the residual block is partitioned according to a binary tree partitioning, inverse transform processing unit 308 may infer or restrict the context assignments for the plurality of residual sub-blocks so that DCT-2 is used as a horizontal transform and DST-7 is used as a vertical transform for a first residual sub-block of the plurality of residual sub-blocks, and that DCT-2 is used as the vertical transform and DST-7 is used as the horizontal transform for a second residual sub-block of the plurality of residual sub-blocks.

In another example, when the residual block has a horizontal size or a vertical size that is less than or equal to 2 samples (e.g., a 2×8 block), inverse transform processing unit 308 may infer or restrict that no transform be applied to the plurality of residual sub-blocks.

In some examples, inverse transform processing unit 308 may infer the context assignments for the plurality of residual sub-blocks base on the current block being an intra-predicted video block. In other examples, inverse transform processing unit 308 may infer the context assignments for the plurality of residual sub-blocks base on the current block being an inter-predicted video block. In another example, inverse transform processing unit 308 may infer the context assignments for the plurality of residual sub-blocks base on the current block being an inter-predicted video block or an intra-predicted video block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 9).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 9).

Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block. As such, reconstruction unit 310, along with other components of video decoder 300 of FIG. 10, represent examples of means for decoding a current block using residual data.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including a memory configured to store video data, and one or more processing units implemented in circuitry and configured to receive, in a bitstream that comprises an encoded representation of the video data, information indicative of whether a residual block is partitioned and information indicative of a partition tree type for the residual block based on the residual block being partitioned, wherein the residual block is indicative of a difference between a current block and a prediction block; determining, based on the received information that the residual block is partitioned and the partition tree type for the residual block, a plurality of residual sub-blocks into which the residual block is partitioned according to the partition tree type; produce the residual data for the current block based at least in part on the residual block being partitioned according to the partition tree type into the plurality of residual sub-blocks; and decode the current block using the residual data.

Figure 11:
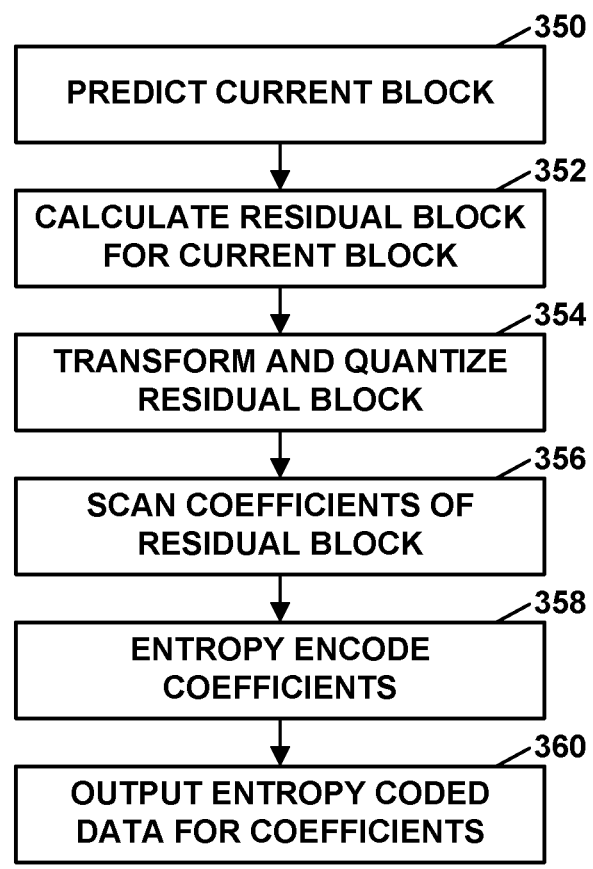
FIG. 11 is a flowchart illustrating an example method for encoding a current block.

FIG. 11 is a flowchart illustrating an example method for encoding a current block. The current block may comprise a current CU. Although described with respect to video encoder 200 (FIGS. 1 and 9), it should be understood that other devices may be configured to perform a method similar to that of FIG. 11.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, unencoded block and the prediction block for the current block. As part of calculating the residual block, video encoder 200 may partition the residual block into a plurality of residual sub-blocks according to at least one of: a quadtree partitioning or a binary tree partitioning. If video encoder 200 partitions the residual block according to the binary tree partitioning, video encoder 200 may horizontally partition or vertically partition the residual block. Further, if video encoder 200 partitions the residual block according to the binary tree partitioning, video encoder 200 may symmetrically partition or asymmetrically partition the residual block.

Video encoder 200 may then transform and quantize coefficients of the residual block (354). Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360). Video encoder 200 may output the entropy encoded data of the block as a bitstream. The bitstream may signal, for a residual block, whether the residual block is partitioned, the partition tree type use to partition the residual block, information indicative of whether the residual block is partitioned and information indicative of the partition tree type for the residual block that is partitioned.

Figure 12:
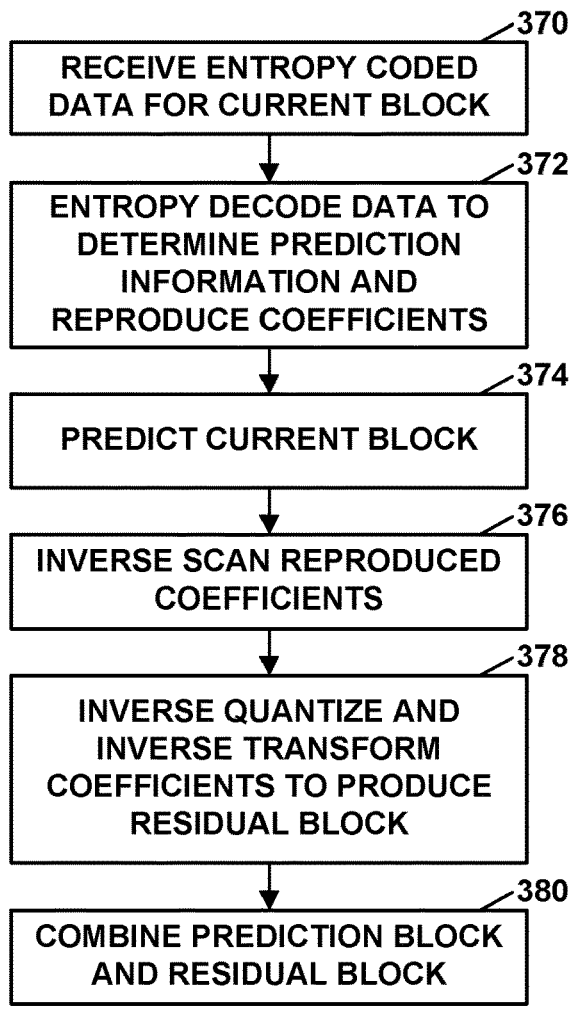
FIG. 12 is a flowchart illustrating an example method for decoding a current block of video data.

FIG. 12 is a flowchart illustrating an example method for decoding a current block of video data. The current block may comprise a current CU. Although described with respect to video decoder 300 (FIGS. 1 and 10), it should be understood that other devices may be configured to perform a method similar to that of FIG. 12.

Video decoder 300 may receive entropy encoded data for the current block, such as a bit stream that includes entropy encoded prediction information and entropy encoded data for coefficients of a residual block corresponding to the current block (370). Video decoder 300 may entropy decode the entropy encoded data to determine prediction information for the current block and to reproduce coefficients of the residual block (372). Video decoder 300 may determine whether the bitstream, for a residual block for the current block, includes information indicative of whether a residual block is partitioned and information indicative of a partition tree type for the residual block based on the residual block being partitioned.

Video decoder 300 may predict the current block (374), e.g., using an intra- or inter-prediction mode as indicated by the prediction information for the current block, to calculate a prediction block for the current block. Video decoder 300 may then inverse scan the reproduced coefficients (376), to create a block of quantized transform coefficients. Video decoder 300 may then inverse quantize and inverse transform the transform coefficients to produce a residual block (378). Video decoder 300 may use such information regarding the partitioning of the residual block to infer or restrict the context assignment and transform selection for the residual block in order to inverse transform the transform coefficients to produce the residual block. Video decoder 300 may ultimately decode the current block by combining the prediction block and the residual block (380).

Figure 13:
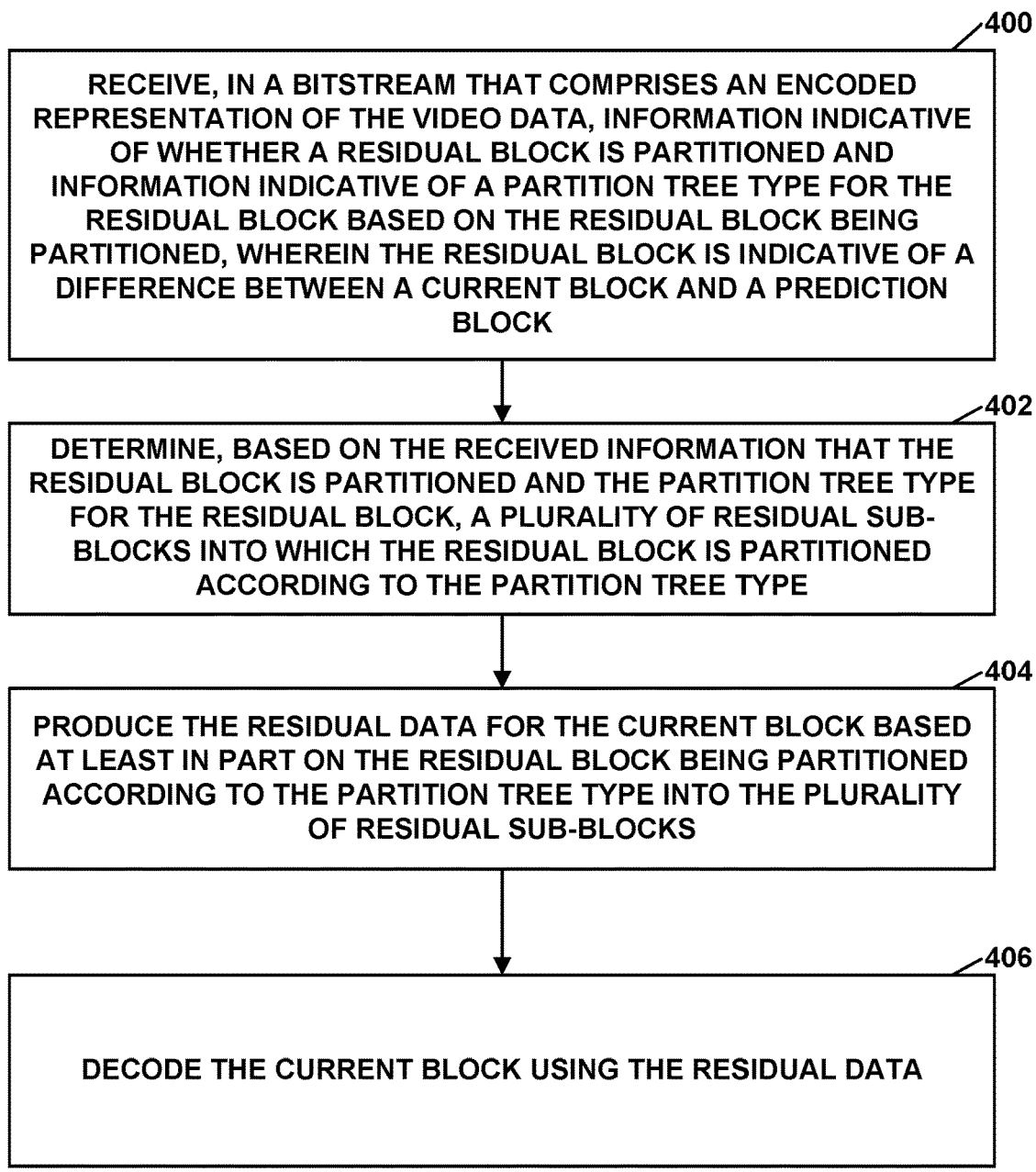
FIG. 13 is a flowchart illustrating an example method for decoding a current block of data having a residual block that is partitioned according to a partition tree type.

FIG. 13 is a flowchart illustrating an example method for decoding a current block of data having a residual block that is partitioned according to a partition tree type. Although described with respect to video decoder 300 (FIGS. 1 and 10), it should be understood that other devices may be configured to perform a method similar to that of FIG. 13. In some examples, video decoder 300 may include one or more of a camera, a computer, a mobile device, a broadcast receiver device, or a set-top box. In some examples, the video decoder 300 includes at least one of: an integrated circuit, a microprocessor, or a wireless communication device. In some examples, the video decoder 300 includes a display configured to display the decoded video data.

Video decoder 300 may receive, in a bitstream that comprises an encoded representation of the video data, information indicative of whether a residual block is partitioned and information indicative of a partition tree type for the residual block based on the residual block being partitioned, wherein the residual block is indicative of a difference between a current block and a prediction block (400).

In some examples, receiving information indicative of the partition tree type may include receiving index information into a set of tree types, and video decoder 300 may determine the partition tree type based on the received index information. In some examples, the set of tree types information includes one or more of a quad tree partitioning and a binary tree partitioning, In some examples, determining the partition tree type may include determining the partition tree type is one of a binary tree partitioning, and video decoder 300 may receive information indicative of whether the residual block is horizontally split or vertically split.

Video decoder 300 may determine, based on the received information that the residual block is partitioned and the partition tree type for the residual block, a plurality of residual sub-blocks into which the residual block is partitioned according to the partition tree type (402).

Video decoder 300 may produce the residual data for the current block based at least in part on the residual block being partitioned according to the partition tree type into the plurality of residual sub-blocks (404). In some examples, video decoder 300 may infer, from the bitstream, transform kernels for the plurality of residual sub-blocks in at least one of: a horizontal direction or a vertical direction based at least in part on one of: the partition tree type for the residual block or a partitioning type for the residual block, where producing the residual data for the current block may further include producing the residual data based at least in part on the transform kernels for the plurality of residual sub-blocks.

Video decoder 300 may decode the current block using the residual data (406).

In some examples, to decode the current block using the residual data, video decoder 300 may decode data representative of a prediction mode for the current block, generate the prediction block for the current block using the prediction mode, and combine the prediction block with the residual data to reproduce the current block.

In some examples, the current block is inter-predicted or intra-predicted. In some examples, the current block comprises a luma block of a coding unit (CU). In some examples, the current block is a coding unit (CU) or a block of the CU, the residual block for the current block is a transform unit (TU) or a block of the TU, and the plurality of residual sub-blocks are non-square sub-TUs and of a different size than the CU.

Figure 14:
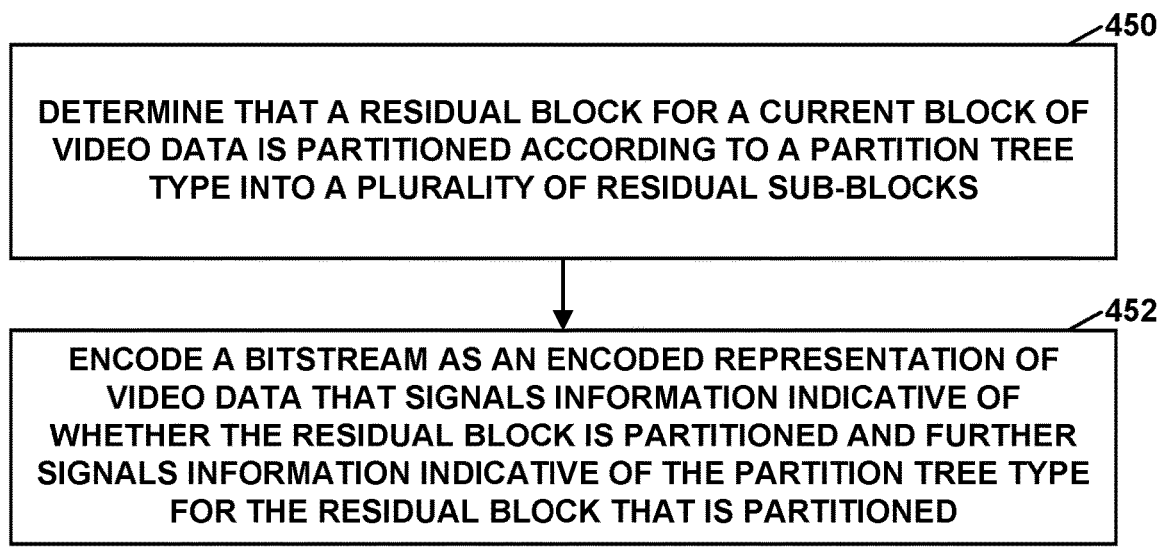
FIG. 14 is a flowchart illustrating an example method for encoding a current block of data having a residual block that is partitioned according to a partition tree type.

FIG. 14 is a flowchart illustrating an example method for encoding a current block of data having a residual block that is partitioned according to a partition tree type. Although described with respect to video encoder 200 (FIGS. 1 and 9), it should be understood that other devices may be configured to perform a method similar to that of FIG. 14. In some examples, video encoder 200 may include at least one of: an integrated circuit, a microprocessor, or a wireless communication device. In some examples, video encoder 200 may include a camera configured to capture the video data. In some examples, video encoder 200 may include one or more of: a camera, a computer, a mobile device, a broadcast receiver device, or a set-top box.

Video encoder 200 may determine that a residual block for a current block of video data is partitioned according to a partition tree type into a plurality of residual sub-blocks (450). Video encoder 200 may encode a bitstream as an encoded representation of video data that signals information indicative of whether the residual block is partitioned and further signals information indicative of the partition tree type for the residual block that is partitioned (452).

In some examples, a bitstream as an encoded representation of video data that signals information indicative of whether the residual block is partitioned and further signals information indicative of the partition tree type for the residual block that is partitioned. In some examples, the set of tree types information includes one or more of a quadtree partitioning and a binary tree partitioning. In some examples, when the information indicative of the partition tree type for the residual block indicates the partition tree type is one of a binary tree partitioning, the bitstream further signals information indicative of whether the residual block is horizontally split or vertically split.

In some examples, the current block is a coding unit (CU) or a block of the CU, the residual block for the current block is a transform unit (TU) or a block of the TU, and the plurality of residual sub-blocks are non-square sub-TUs and of a different size than the CU.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   receiving, in a bitstream that comprises an encoded representation of the video data, information indicative of whether a residual block is partitioned and information indicative of a partition tree type for the residual block based on the residual block being partitioned, wherein the information indicative of the partition tree type is associated only with the residual block, and wherein the residual block is indicative of a difference between a current block and a prediction block;
   determining, based on the received information that the residual block is partitioned and the partition tree type for the residual block, a partitioning of the residual block into a plurality of residual sub-blocks according to the partition tree type;
   inferring, based on the determined partitioning of the residual block into the plurality of residual sub-blocks and without receiving in the bitstream for the residual block a syntax element expressly indicating transform types of transform kernels for the plurality of residual sub-blocks in at least one of a horizontal direction or a vertical direction, transform types of transform kernels for the plurality of residual sub-blocks in at least one of a horizontal direction or a vertical direction;
   producing residual data for the current block based at least in part on the residual block being partitioned according to the partition tree type into the plurality of residual sub-blocks and using the inferred transform kernel; and
   decoding the current block using the residual data.

2. The method of claim 1, wherein receiving the information indicative of the partition tree type comprises receiving index information into a set of tree types, the method further comprising determining the partition tree type based on the received index information.

3. The method of claim 2, wherein the set of tree types includes one or more of a quad tree partitioning and a binary tree partitioning.

4. The method of claim 2, wherein determining the partition tree type comprises determining the partition tree type is a binary tree partitioning, the method further comprising receiving information indicative of whether the residual block is horizontally split or vertically split.

5. The method of claim 1, wherein the current block is inter-predicted or intra-predicted.

6. The method of claim 1, wherein the current block comprises a luma block of a coding unit (CU).

7. The method of claim 1, wherein:
   the current block is a coding unit (CU) or a block of the CU;
   the residual block for the current block is a transform unit (TU) or a block of the TU; and
   the plurality of residual sub-blocks are non-square sub-TUs and of a different size than the CU.

8. The method of claim 1, wherein decoding the current block comprises:
   decoding data representative of a prediction mode for the current block;
   generating the prediction block for the current block using the prediction mode; and
   combining the prediction block with the residual data to reproduce the current block.

9. A device for decoding video data, the device comprising:
   a memory configured to store video data; and
   a processor implemented in circuitry and configured to:
      receive, in a bitstream that comprises an encoded representation of the video data, information indicative of whether a residual block is partitioned and information indicative of a partition tree type for the residual block based on the residual block being partitioned, wherein the information indicative of the partition tree type is associated only with the residual block, and wherein the residual block is indicative of a difference between a current block and a prediction block;
      determine, based on the received information that the residual block is partitioned and the partition tree type for the residual block, a partitioning of the residual block into a plurality of residual sub-blocks according to the partition tree type;
      infer, based on the determined partitioning of the residual block into the plurality of residual sub-blocks and without the processor receiving in the bitstream for the residual block a syntax element expressly indicating transform types of transform kernels for the plurality of residual sub-blocks in at least one of a horizontal direction or a vertical direction, transform types of transform kernels for the plurality of residual sub-blocks in at least one of a horizontal direction or a vertical direction;
      produce residual data for the current block based at least in part on the residual block being partitioned according to the partition tree type into the plurality of residual sub-blocks and using the inferred transform kernel; and
decode the current block using the residual data.

10. The device of claim 9, wherein:
the processor configured to receive information indicative of the partition tree type is further configured to receive index information into a set of tree types; and
the processor is further configured to determine the partition tree type based on the received index information.

11. The device of claim 10, wherein the set of tree types includes one or more of a quad tree partitioning and a binary tree partitioning.

12. The device of claim 10, wherein:
the processor configured to determine the partition tree type is further configured to determine the partition tree type is a binary tree partitioning; and
the processor is further configured to receive information indicative of whether the residual block is horizontally split or vertically split.

13. The device of claim 9, wherein the current block is inter-predicted or intra-predicted.

14. The device of claim 9, wherein the current block comprises a luma block of a coding unit (CU).

15. The device of claim 9, wherein:
the current block is a coding unit (CU) or a block of the CU;
the residual block for the current block is a transform unit (TU) or a block of the TU; and
the plurality of residual sub-blocks are non-square sub-TUs and of a different size than the CU.

16. The device of claim 9, wherein the processor configured to decode the current block is further configured to:
decode data representative of a prediction mode for the current block;
generate the prediction block for the current block using the prediction mode; and
combine the prediction block with the residual data to reproduce the current block.

17. The device of claim 9, further comprising a display configured to display the decoded current block.

18. The device of claim 9, wherein the device comprises one or more of a camera, a computer, a mobile device, a broadcast receiver device, or a set-top box.

19. The device of claim 9, wherein the device comprises at least one of:
an integrated circuit;
a microprocessor; or
a wireless communication device.

20. A non-transitory computer-readable storage medium having stored thereon instructions that, when executed, cause a processor to:
receive, in a bitstream that comprises an encoded representation of video data, information indicative of whether a residual block is partitioned and information indicative of a partition tree type for the residual block based on the residual block being partitioned, wherein the information indicative of the partition tree type is associated only with the residual block, wherein the residual block is indicative of a difference between a current block and a prediction block;
determine, based on the received information that the residual block is partitioned and the partition tree type for the residual block, a partitioning of the residual block into a plurality of residual sub-blocks according to the partition tree type;
infer, based on the determined partitioning of the residual block into the plurality of residual sub-blocks and without the processor receiving, for the residual block, a syntax element expressly indicating transform types of transform kernels for the plurality of residual sub-blocks in at least one of a horizontal direction or a vertical direction, transform types of transform kernels for the plurality of residual sub-blocks in at least one of a horizontal direction or a vertical direction;
produce residual data for the current block based at least in part on the residual block being partitioned according to the partition tree type into the plurality of residual sub-blocks and using the inferred transform kernel; and
decode the current block using the residual data.

21. A device for decoding video data, the device comprising:
means for receiving, in a bitstream that comprises an encoded representation of the video data, information indicative of whether a residual block is partitioned and information indicative of a partition tree type for the residual block based on the residual block being partitioned, wherein the information indicative of the partition tree type is associated only with the residual block, and wherein the residual block is indicative of a difference between a current block and a prediction block;
means for determining, based on the received information that the residual block is partitioned and the partition tree type for the residual block, a partitioning of the residual block into a plurality of residual sub-blocks according to the partition tree type;
means for inferring, based on the determined partitioning of the residual block into the plurality of residual sub-blocks and without receiving in the bitstream for the residual block a syntax element expressly indicating transform types of transform kernels for the plurality of residual sub-blocks in at least one of a horizontal direction or a vertical direction, transform types of transform kernels for the plurality of residual sub-blocks in at least one of a horizontal direction or a vertical direction;
means for producing residual data for the current block based at least in part on the residual block being partitioned according to the partition tree type into the plurality of residual sub-blocks and using the inferred transform kernel; and
means for decoding the current block using the residual data.

22. A method of encoding video data, the method comprising:
partitioning a residual block for a current block of video data according to a partition tree type into a plurality of residual sub-blocks;
determining, based on the determined partitioning of the residual block into the plurality of residual sub-blocks, transform types of transform kernels for the plurality of residual sub-blocks in at least one of a horizontal direction or a vertical direction; and
encoding a bitstream as an encoded representation of video data that signals information indicative of whether the residual block is partitioned and further signals information indicative of the partition tree type for the residual block that is partitioned, wherein the information indicative of the partition tree type is associated only with the residual block and wherein the bitstream is encoded without a signaled index for the transform types for the plurality of residual sub-blocks.

23. The method of claim 22, wherein:
the bitstream that signals the information indicative of the partition tree type for the residual block includes index information into a set of tree types.

24. The method of claim 23, wherein the set of tree types includes one or more of a quadtree partitioning and a binary tree partitioning.

25. The method of claim 23, wherein:
when the information indicative of the partition tree type for the residual block indicates the partition tree type is the binary tree partitioning, the bitstream further signals information indicative of whether the residual block is horizontally split or vertically split.

26. The method of claim 22, wherein:
the current block is a coding unit (CU) or a block of the CU;
the residual block for the current block is a transform unit (TU) or a block of the TU; and
the plurality of residual sub-blocks are non-square sub-TUs and of a different size than the CU.

27. A device for encoding video data, the device comprising:
a memory configured to store video data; and
a processor implemented in circuitry and configured to:
partition a residual block for a current block of video data according to a partition tree type into a plurality of residual sub-blocks;
determine, based on the partitioning of the residual block into the plurality of residual sub-blocks, transform types of transform kernels for the plurality of residual sub-blocks in at least one of a horizontal direction or a vertical direction; and
encode a bitstream as an encoded representation of video data that signals information indicative of whether the residual block is partitioned and further signals information indicative of the partition tree type for the residual block that is partitioned, wherein the information indicative of the partition tree type is associated only with the residual block and wherein the bitstream is encoded without a signaled index for the transform types for the plurality of residual sub-blocks.

28. The device of claim 27, wherein:
the bitstream that signals the information indicative of the partition tree type for the residual block includes index information into a set of tree types.

29. The device of claim 28, wherein the set of tree types includes one or more of a quadtree partitioning and a binary tree partitioning.

30. The device of claim 29, wherein:
when the bitstream signals that the partition tree type for the residual block is the binary tree partitioning, the bitstream further signals a partitioning type for the residual block that indicates whether the residual block is horizontally split or vertically split.

31. The device of claim 27, wherein:
the current block is a coding unit (CU) or a block of the CU;
the residual block for the current block is a transform unit (TU) or a block of the TU; and
the plurality of residual sub-blocks are non-square sub-TUs and of a different size than the CU.

32. The device of claim 27, further comprising a camera configured to capture the video data.

33. The device of claim 27, wherein the device comprises one or more of a camera, a computer, a mobile device, a broadcast receiver device, or a set-top box.

34. The device of claim 27, wherein the device comprises at least one of:
an integrated circuit;
a microprocessor; or
a wireless communication device.

35. The method of claim 1, wherein the transform types include a DST-7, a DCT-8, or a DCT-2.

36. The device of claim 9, wherein the transform types include a DST-7, a DCT-8, or a DCT-2.

37. The method of claim 22, wherein the transform types include a DST-7, a DCT-8, or a DCT-2.

38. The device of claim 27, wherein the transform types include a DST-7, a DCT-8, or a DCT-2.

* * * * *